(12) United States Patent
Van Wagoner et al.

(10) Patent No.: US 8,969,693 B2
(45) Date of Patent: Mar. 3, 2015

(54) STRINGED INSTRUMENT PRACTICE DEVICE

(71) Applicant: Pocket Strings, LLC, Salt Lake City, UT (US)

(72) Inventors: Gavin Van Wagoner, Salt Lake City, UT (US); Te Kalei Lawrence, Woods Cross, UT (US)

(73) Assignee: Pocket Strings, LLC, Salt Lake City, UT (US)

( * ) Notice: Subject to any disclaimer, the term of this patent is extended or adjusted under 35 U.S.C. 154(b) by 0 days.

(21) Appl. No.: 14/143,155

(22) Filed: Dec. 30, 2013

(65) Prior Publication Data

US 2014/0109747 A1    Apr. 24, 2014

Related U.S. Application Data

(63) Continuation of application No. 13/424,134, filed on Mar. 19, 2012, now Pat. No. 8,618,398.

(60) Provisional application No. 61/467,753, filed on Mar. 25, 2011, provisional application No. 61/566,156, filed on Dec. 2, 2011.

(51) Int. Cl.
  *G10D 3/00* (2006.01)
  *G10D 3/06* (2006.01)
  *G09B 15/06* (2006.01)

(52) U.S. Cl.
  CPC . *G10D 3/06* (2013.01); *G09B 15/06* (2013.01)
  USPC .......................................................... 84/293

(58) Field of Classification Search
  CPC .................................. G10D 3/06; G09B 15/06
  See application file for complete search history.

(56) References Cited

U.S. PATENT DOCUMENTS

| | | | | |
|---|---|---|---|---|
| 351,111 | A * | 10/1886 | Kaspar | 84/465 |
| 936,181 | A * | 10/1909 | Steckelberb | 84/465 |
| 1,841,398 | A * | 1/1932 | Bergh | 84/274 |
| 1,848,920 | A * | 3/1932 | Bergh | 84/173 |
| 3,218,904 | A * | 11/1965 | Hartman | 84/485 R |
| D244,103 | S * | 4/1977 | Greer | D19/62 |
| 4,031,801 | A * | 6/1977 | Cecchini | 84/465 |
| 4,065,995 | A * | 1/1978 | Greer | 84/465 |
| 4,112,804 | A * | 9/1978 | Cecchini | 84/173 |
| 4,364,298 | A * | 12/1982 | Piazza | 84/465 |
| D284,203 | S * | 6/1986 | Landau | D19/62 |
| 5,756,914 | A * | 5/1998 | Streibl | 84/465 |
| 5,811,704 | A * | 9/1998 | Anderko | 84/470 R |
| D403,012 | S * | 12/1998 | Anderko | D17/14 |
| 5,952,595 | A * | 9/1999 | Carnell | 84/465 |
| 6,127,615 | A * | 10/2000 | Rosenberg | 84/465 |

(Continued)

*Primary Examiner* — Robert W Horn
(74) *Attorney, Agent, or Firm* — Michael B. Dodd; Dodd Law Group, LLC

(57) ABSTRACT

The present invention extends to practice devices for practicing to play stringed instruments. More specifically, the present invention relates to a practice device that may assist a user in learning how to properly finger and play a stringed musical instrument. A user can hold an elongate handle and place one or more of his or her fingers on strings to practice fingerings that are used to play chords/notes. Real instrument strings can be used, helping to strengthen a user's fingertips and get the fingertips accustomed to holding/pinching the instrument strings. Further, the stringed instrument practice device can be portable and sized to fit within the user's hand. Accordingly, a user can realize advantages of the invention and utilize practice methods while the user is "on the go," riding on a bus, watching television, waiting in line, etc.

20 Claims, 34 Drawing Sheets

(56) References Cited

U.S. PATENT DOCUMENTS

| | | | |
|---|---|---|---|
| 6,911,011 B2 * | 6/2005 | Haag | 601/40 |
| 7,064,260 B2 * | 6/2006 | Willard | 84/465 |
| D529,092 S * | 9/2006 | Ambrose, Sr. | D19/62 |
| 7,157,633 B1 * | 1/2007 | Kopesec | 84/293 |
| 7,230,175 B2 * | 6/2007 | Whiteside | 84/465 |
| 7,262,354 B2 * | 8/2007 | Orred et al. | 84/293 |
| 7,304,224 B1 * | 12/2007 | Bettis et al. | 84/293 |
| D574,037 S * | 7/2008 | LeGrady et al. | D17/20 |
| 7,598,449 B2 * | 10/2009 | Sullivan | 84/646 |
| 7,897,866 B2 * | 3/2011 | Sullivan | 84/724 |
| 8,022,288 B2 * | 9/2011 | Sullivan | 84/615 |
| 8,124,863 B2 * | 2/2012 | Van Wagoner | 84/293 |
| 8,173,887 B2 * | 5/2012 | Sullivan | 84/724 |
| 8,415,550 B2 * | 4/2013 | Sullivan | 84/724 |
| 8,581,083 B2 * | 11/2013 | Van Wagoner | 84/314 R |
| 8,618,398 B2 * | 12/2013 | Van Wagoner et al. | 84/465 |
| 2005/0109196 A1 * | 5/2005 | Whiteside | 84/722 |
| 2008/0105108 A1 * | 5/2008 | Saenz | 84/485 R |
| 2010/0083808 A1 * | 4/2010 | Sullivan | 84/315 |
| 2012/0240744 A1 * | 9/2012 | Van Wagoner et al. | 84/293 |
| 2013/0180389 A1 * | 7/2013 | Sullivan | 84/723 |
| 2014/0109747 A1 * | 4/2014 | Van Wagoner et al. | 84/293 |
| 2014/0260889 A1 * | 9/2014 | Anderson | 84/293 |

* cited by examiner

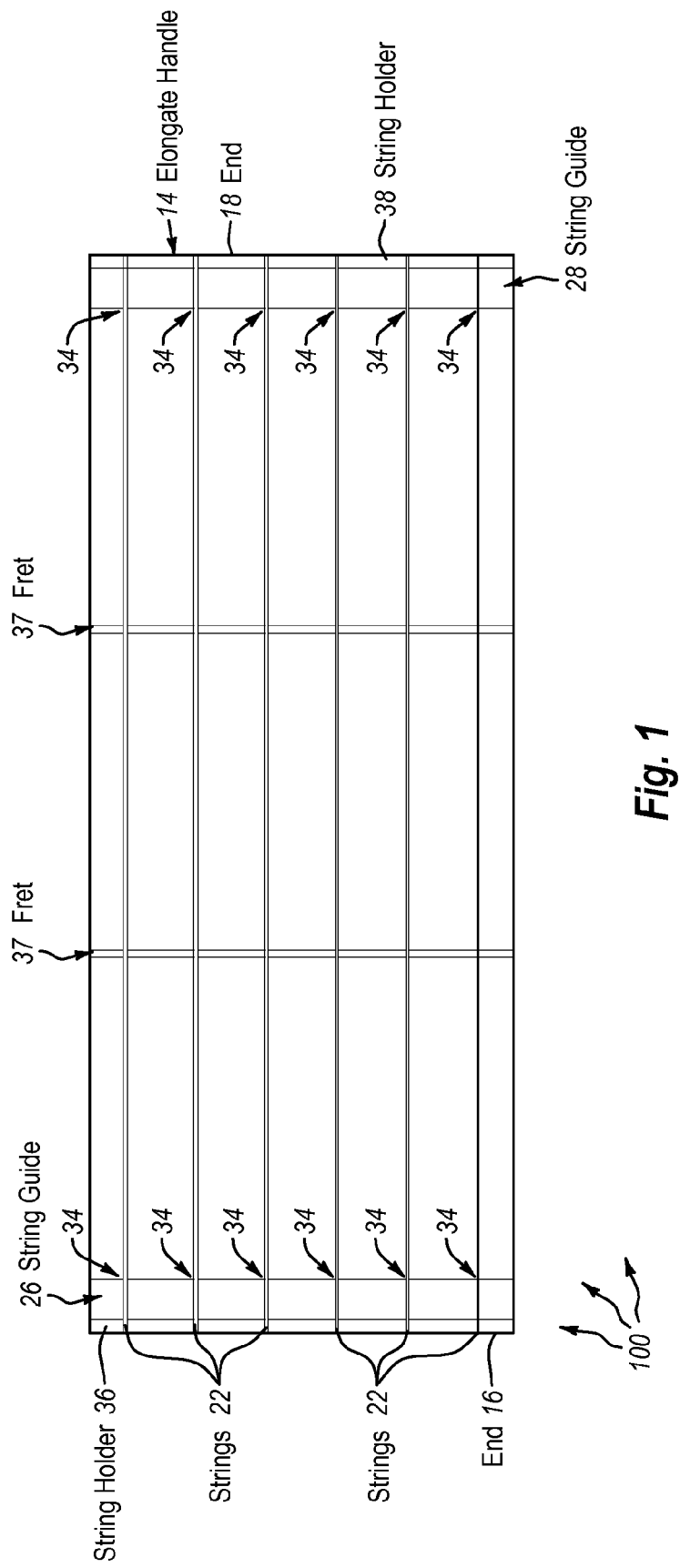

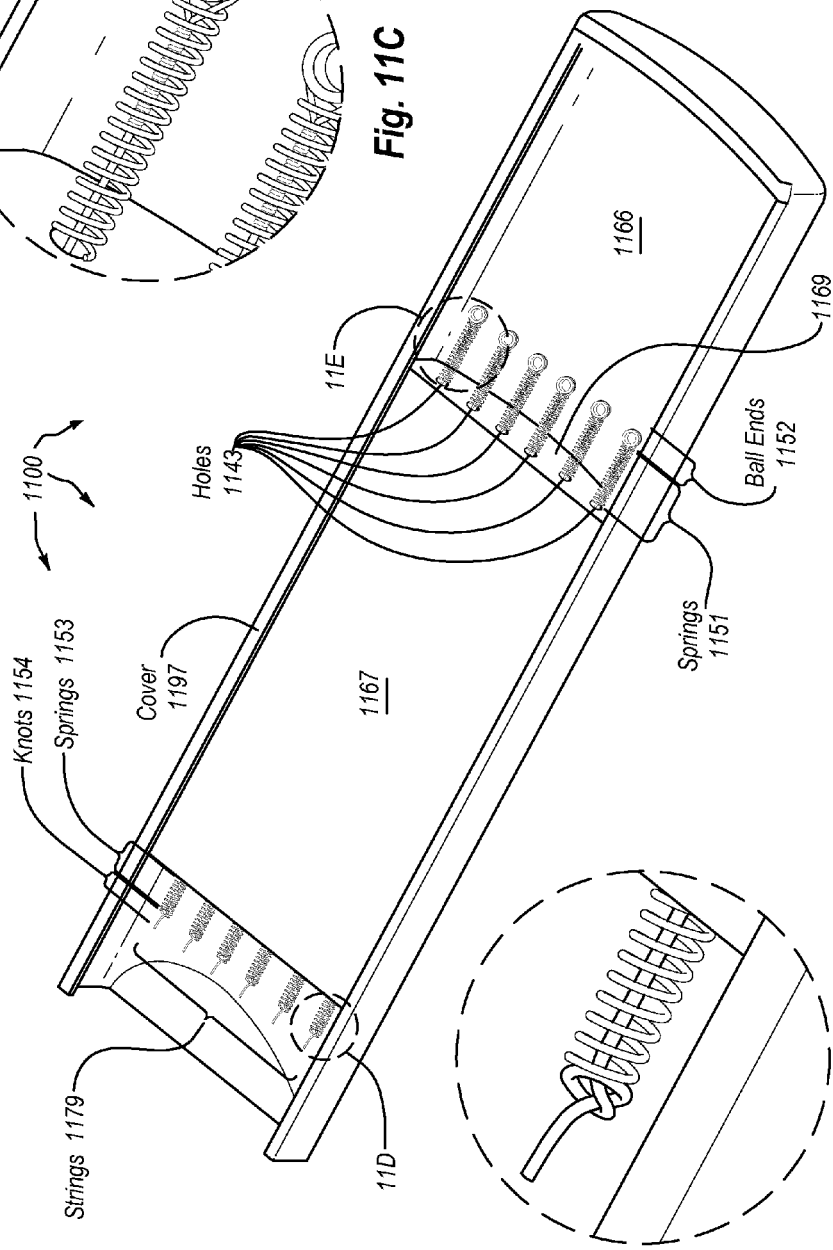

STRINGED INSTRUMENT PRACTICE DEVICE

CROSS-REFERENCE TO RELATED APPLICATIONS

This application is a continuation of U.S. patent application Ser. No. 13/424,134, entitled "Stringed Instrument Practice Device", filed Mar. 19, 2012, which is incorporated herein in its entirety. That application claims the benefit of U.S. Provisional Patent Application No. 61/467,753, entitled "Stringed Instrument Practice Device", filed Mar. 25, 2011, which is incorporated herein in its entirety. That application claims the benefit of U.S. Provisional Patent Application No. 61/566,156, entitled "Stringed Instrument Practice Device", filed Dec. 2, 2011, which is incorporated herein in its entirety

BACKGROUND

Background and Relevant Art

Many stringed instruments (such as, guitars, bass-guitars, violins, violas, cellos, basses, double-basses, mandolins, ukuleles, banjos, etc.) necessitate that the player use his or her fingers to press the strings against a neck/fingerboard in order to produce different chords/notes. Unfortunately, learning to form the hand/finger positions necessary to make these chords/notes is often a difficult and arduous task for many students learning to play these instruments. Generally, students are simply required to practice these fingerings by "trial and error" until they become natural and memorized.

Due at least in part to the difficulties in learning these finger positions, many devices have been designed to help students more readily recognize and learn these fingerings. However, many of these practice devices are relatively large in size, difficult to use, are not portable/handheld, and do not accurately represent the "look and feel" of the actual instrument. For example, many practice devices have differing strings, contour, and/or fret spacing from their corresponding stringed instrument.

Some practice devices, although smaller than an actual stringed instrument, are still relatively large. This larger size limits to some extent where the practice devices can be used. The required orientation of these practices devices for performing meaningful practice may also be less than ideal when compared to an actual stringed instrument. For example, some guitar practice devices can require that relatively bulky components for modifying string tension be located near a user's strumming had during practicing.

BRIEF SUMMARY

The present invention extends to handheld practice devices for practicing to play stringed instruments, including various instruments in the chordophone family, such as, for example, electric guitars, acoustic guitars, violins, violas, cellos, basses, double-basses, mandolins, ukuleles, banjos, etc. More specifically, the present invention relates to a practice device that may assist a user in learning how to properly finger and play a stringed musical instrument.

Embodiments of the invention include a stringed instrument practice device. The stringed instrument practice device includes an elongate handle having a first end, second end, a first side, a second side, and a top portion. The elongate handle is configured to represent a portion of the neck area of a stringed instrument where a user can depress strings against the neck of the stringed instrument with their fingers in various different combinations. The elongate handle can be specifically configured for practicing a particular type of stringed instrument. For example, an elongate handle for practicing guitar can include a plurality of frets of a guitar neck. The frets can be spaced and sized as they would be on an actual guitar.

The stringed instrument practice device also includes a plurality of strings. For each of the plurality of strings, a first string holder at the first end and a second string holder at the second end secure the strings. The plurality of strings runs along the top portion between the first end of the elongate handle and the second end of the elongate handle. The number and arrangement of strings can be specifically configured for practicing a particular type of stringed instrument. For example, six strings can be strung on an appropriate elongate handle for practicing guitar. The strings can be spaced and tensioned as they would be on an actual guitar. Accordingly, a user can place an arrangement of one or more fingers on the strings of a practice device as a way of practicing placement of the arrangement of one or more fingers on the corresponding actual stringed instrument (e.g., to make a chord).

A recessed portion runs along the first side of the elongate handle. The recessed portion is configured to receive a portion of a component that is slidable within the recessed portion. A guide member of a slidable cover component can be slidably engaged within the recessed portion. When engaged, the slidable cover component can slide within the recessed portion to expose or cover the plurality of strings running along the top portion of the elongate handle.

In some embodiments, the slidable cover component includes a plurality of ridges. In these embodiments, the plurality of ridges can be used for simulated strumming of strings of the musical instrument. In other embodiments, the slidable cover component includes a second plurality of strings. In these other embodiments, the second plurality of strings can be used for simulated strumming of strings of the musical instrument.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an example stringed instrument practice device.

FIGS. 11A-11D illustrate various views of a stringed instrument practice device cover.

DETAILED DESCRIPTION

Figure 2A:
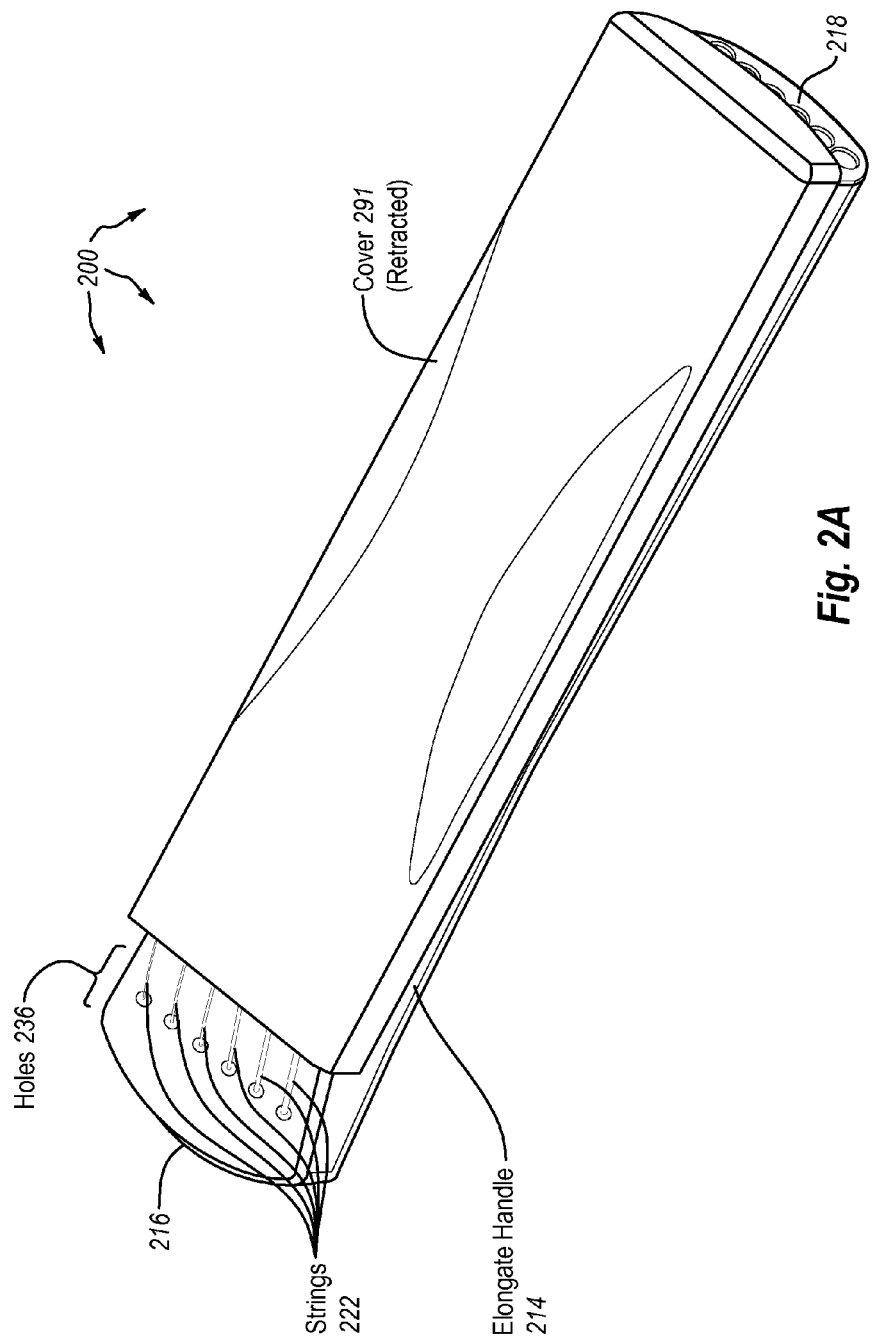
FIGS. 2A and 2B illustrate an example stringed instrument practice device.

The present invention extends to handheld practice devices for practicing to play stringed instruments, including various instruments in the chordophone family, such as, for example, electric guitars, acoustic guitars, violins, violas, cellos, basses, double-basses, mandolins, ukuleles, banjos, etc. More specifically, the present invention relates to a practice device that may assist a user in learning how to properly finger and play a stringed musical instrument.

Embodiments of the invention include a stringed instrument practice device. The stringed instrument practice device includes an elongate handle having a first end, second end, a first side, a second side, and a top portion. The elongate handle is configured to represent a portion of the neck area of a stringed instrument where a user can depress strings against the neck of the stringed instrument with their fingers in various different combinations. The elongate handle can be specifically configured for practicing a particular type of stringed instrument. For example, an elongate handle for practicing guitar can include a plurality of frets of a guitar neck. The frets can be spaced and sized as they would be on an actual guitar.

The stringed instrument practice device also includes a plurality of strings. For each of the plurality of strings, a first string holder at the first end and a second string holder at the second end secure the strings. The plurality of strings runs (i.e., are strung) along the top portion between the first end of the elongate handle and the second end of the elongate handle. The number and arrangement of strings can be specifically configured for practicing a particular type of stringed instrument. For example, six (or twelve) strings can be strung on an appropriate elongate handle for practicing guitar. The strings can be spaced and tensioned as they would be on an actual guitar. Accordingly, a user can place an arrangement of one or more fingers on the strings of a practice device as a way of practicing placement of the arrangement of one or more fingers on the corresponding actual stringed instrument (e.g., to make a chord).

A recessed portion runs along the first side of the elongate handle. The recessed portion is configured to receive a portion of a component that is slidable within the recessed portion. A guide member of a slidable cover component can be slidably engaged within the recessed portion. When engaged, the slidable cover component can slide within the recessed portion to expose or cover the plurality of strings running along the top portion of the elongate handle.

In some embodiments, the slidable cover component includes a plurality of ridges. In these embodiments, the plurality of ridges can be used for simulated strumming of strings of the musical instrument. In other embodiments, the slidable cover component includes a second plurality of strings. In these other embodiments, the second plurality of strings can be used for simulated strumming of strings of the musical instrument.

For example, a user of a stringed instrument practice device can grip the slidable cover component and slide the slideble cover component to expose the strings. Sliding the slideble cover component to expose the strings also extends the slidabe cover component away from the elongate handle. During practice, the user can rest the slidable cover component against part of their body to provide support for the stringed instrument practice device. When practice is complete, the user can slide the slidabe cover component to cover the strings (thus providing some protection for the strings). Sliding the slideble cover component to cover the strings also retracts the slidabe cover component onto the elongate handle. Accordingly, the stringed practice device is configured (when not including a slidable cover component) or is configurable (when including a slidabe cover component) to take up less space and be more easily transportable.

A stringed instrument practice device without a slidable cover component can be used to practice in more confined spaces. A stringed practice device with a slidable cover component can also be used to practice in more confined spaces by removing the slidable extension component.

FIG. 1 illustrates an example stringed instrument practice device 100. Stringed instrument practice device 100 is configured to assist a user in learning the finger positions that are used to play a musical stringed instrument, such as, for example, a guitar. However, embodiments of the invention include stringed practice devices to assist the a user in learning how to play other types of stringed instruments including bass-guitars, violins, violas, cellos, basses, double basses, mandolins, ukuleles, banjos, etc.

As depicted, stringed instrument practice device 100 includes elongate handle 14 (including ends 16 and 18), strings 22, frets 37, string guides 26 and 28, and string holders 36 and 38. Generally, each different component of stringed instrument practice device 100 can be made of a different material or different materials, including plastics, metals, metal alloys, woods, glass, graphite, corian, nylon, fluorocarbons, animal products (including bone), plant products, as well as combinations of one or more of these materials. In some embodiments, different components of stringed instrument practice device 100 are made from similar (or even the same) materials used to make stringed instruments for which it is used for practice. For example, when stringed instrument practice device 100 is to be used to practice guitar, the components of stringed instrument practice device 100 can be constructed from materials used to make a guitar.

Elongate handle 14 can be configured similar to the neck or fretboard of an actual stringed instrument, such as, for example, the neck of a guitar, banjo, ukulele, or mandolin or the fingerboard of a violin, viola, cello, bass, double bass, etc. Elongate handle 14 is configured to be handheld. That is, the size and configuration of elongate handle 14 are for holding in a user's hand. However, it should be understood that this does not necessarily mean that the whole of elongate handle 14 fits entirely within the user's hand. For example, although a portion of elongate handle 14 is held within the user's hand, end 16 and/or end 18 can extend past the end of the user's hand when elongate handle 14 is held by a user.

The length of elongate handle 14 can vary depending on one or more of: the type of stringed instrument it represents (e.g., a cello vs. a violin), how much of the neck or fingerboard of a stringed instrument is used for meaningful practice (e.g., how many frets are used to form chords), space requirements of a practice area, and desired level of portability. In some embodiments, elongate handle 14 is approximately ten inches in length (e.g., a stringed instrument practice device for practicing guitar that has five or six frets). In other embodiments, elongate handle 14 is approximately eight inches in length (e.g., a stringed instrument practice device for practicing guitar that has three or four frets). In further embodiments, elongate handle 14 is sized and configured specifically for fitting in a pocket (e.g., a pants or shirt pocket). Shorted or longer stringed instrument practice devices are also possible.

In some embodiments, elongate handle 14 is a single component combining a neck portion along with a fingerboard or fret board on top of the neck portion. For example, a neck portion and topside fret board can be constructed from a single piece of wood or other material. Alternately, in other embodiments, a neck portion and fingerboard or fret board are independently constructed (possible from different materials) and then the fingerboard or fret board is secured (e.g., glued) onto the top of the neck portion. The neck portion can be constructed from wood, graphite, aluminum, carbon fiber, etc. The fingerboard or fret board can be constructed from wood, such as, for example, rosewood, ebony, maple, or composite materials, such as, for example, high pressure laminate ("HPL") or resin.

In some embodiments, elongate handle 14 includes multiple sections that are connected to one another to form elongate handle 14. For example, elongate handle 14 can include two or more separate sections (each section constructed as a single component or including separately constructed components that were subsequently attached together) that are joined together to provide the full-sized elongate handle 14, for practicing purposes. The multiple sections of elongate handle 14 can be hingedly coupled together, permitting elongate handle 14 to fold into an even more compact configuration when stored, and unfolded into the depicted configured for use as a practicing device. Other mechanisms, such as, for example, a dowel pin and hole system, can also be used to join the multiple sections into elongate handle 14.

Stringed instrument practice device 100 can include a plurality of strings that are mechanically secured to elongate handle 14. As depicted in FIG. 1, strings 22 (six strings) are mechanically connected to elongate handle 14. Strings 22 are strung across the elongate handle 14 extending between end 16 and end 18. Strings 22 can be strings that are otherwise usable on an actual stringed instrument. Strings 22 can also be matched to the type of stringed instrument for which stringed instrument practice device 100 is to be used for practice. For example, strings 22 can be guitar strings when stringed instrument practice device 100 is to be used for practicing guitar.

The use of appropriate strings enhances a user's practice experience. For example, using real instrument strings matched to a specific stringed instrument provides a more realistic practicing experience for a user. The use of real instrument strings on stringed instrument practice device 100 also permits a user's finger tips to adjust to the feel/toughness of the instrument strings in preparation for playing a stringed instrument. Strings can constructed from animal products (e.g., used to make gut strings), plant products, polymer materials, such as, for example, nylon and fluorocarbon, metals, and metal alloys incorporating steel, nickel, or phosphor bronze. Strings can also be constructed from a combination of materials, such as, for example, a stranded synthetic core (e.g., Perlon or other nylon) wound with various metals or a (solid or stranded) steel core wound with various other metals.

As depicted, string guides 26 and 28 are used to space strings 22 from one another at ends 16 and 18 respectively. Strings 22 can be pulled with sufficient tension such that string spacing provided by string guides 26 and 28 remains essentially the same along the length of elongate handle 14. String guides 26 and 28 can be made of plastic or other appropriate materials. String guides 26 and 28 include grooves 34 that align strings 22 in specified positions on elongate handle 14 and also prevent the strings from moving along the width of elongate handle 14. String guides 26 and/or 28 can be or represent a nut or saddle of an actual guitar. String guides can be constructed from bone, plastic, brass, corian, graphite, stainless steel, or other appropriate materials.

String holders 36 and 38 are used to mechanically secure strings 22 to elongate handle 14 at ends 16 and 18 respectively. Various mechanisms, such as, for example, glue, screws, plates, blocks, clamps, ball ends, etc., can be used to mechanically secure strings 22 to elongate handle 14. String holders 36 and 38 are used to maintain (and potentially adjust) tension in strings 22 and also prevent the strings from moving along the length of elongate handle 14. In some embodiments, string holders 36 and 38 are similar to a bridge.

As depicted, stringed instrument practice device 100 also includes a number of frets 37. Frets 37 are positioned along the handle 14 and are designed to guide the user in positioning their hands and/or fingertips (e.g., to form chords). Frets 37 can be added to embodiments that correspond to guitars or other stringed instruments that include frets. For embodiments corresponding to other stringed instruments (e.g., violin, cello, and the like), frets 37 can be omitted. Frets can be constructed from (e.g., jumbo or medium) fret wire of various different heights. In some embodiments, fret wire is nickel alloy or stainless steel.

Stringed instrument practice device 100 can include essentially any number of frets 37. In some embodiments (e.g., as depicted in FIG. 1), stringed instrument practice device 100 includes a plurality of frets 37. The number of frets included in stringed instrument practice device 100 can be tailored for the application (e.g., type of practicing) in view of the overall length of stringed instrument practice device 100.

On a guitar, fewer frets may be used to practice chords than to practice scales. Thus, a version of stringed instrument practice device 100 for practicing chords can include fewer frets 37 (and thus can be shorter) than another version of stringed instrument practice device 100 for practicing scales (or practicing both scales and chords). For example, a version of stringed instrument practice device 100 for practicing chords can include three frets 37 (dividing elongate handle 14 into four segments). On the other hand, another version of stringed instrument practice device 100 for practicing chords can include five frets 37 (dividing elongate handle 14 into six segments). Other versions of stringed instrument practice device can have other different numbers of frets 37 (e.g., four frets, six frets, seven frets, etc.)

Figure 2B:
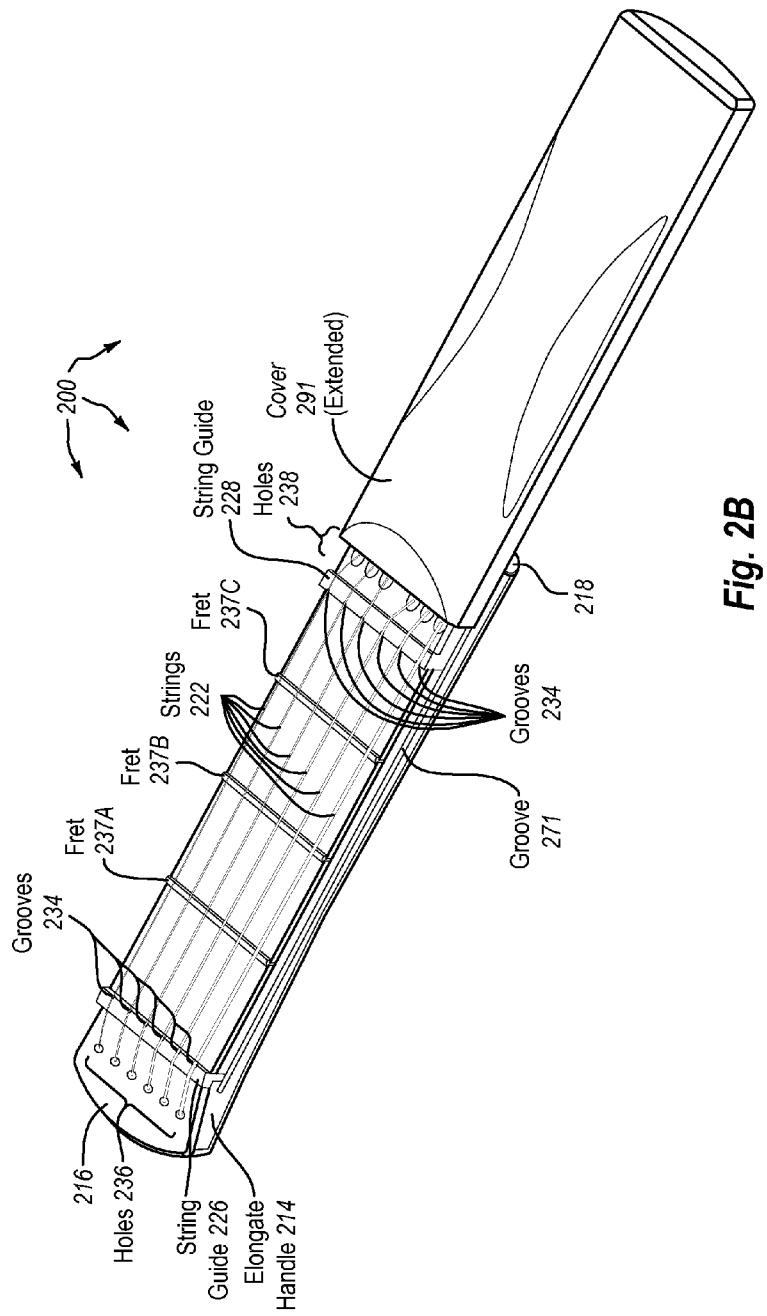

FIGS. 2A and 2B illustrate example stringed instrument practice device 200. FIG. 2A depicts a view of the front side of stringed instrument practice device 200 (or the side of stringed instrument practice device 200 that faces away from a user when practicing). As depicted in FIG. 2A, stringed instrument practice device 200 includes elongate handle 214 (having ends 216 and 218), strings 222, holes 236, and cover 291. In FIG. 2A, cover 291 is retracted to cover other components on the front side of stringed instrument practice device 200.

Turning to FIG. 2B, stringed instrument practice device 200 also includes groove 271. In general, cover 291 can include guide members slidable within groove 271 (and potentially another corresponding groove on the other side of elongate hand 214, not shown). Thus, a user can slide cover 291 towards end 216 (retracting cover 291) or towards end 218 (extending cover 291) when appropriate. In FIG. 2B, cover 291 is extended towards end 218.

When cover 291 is extended, other components on the front side of stringed instrument practice device 200 are exposed. As depicted, these other components include strings 222, frets 237A-237C (three frets), string guide 226, string guide 228, and holes 238. Elongate handle 214 can be constructed from various materials and combines a neck portion along with a fret board on top of the neck portion. Frets 237A-237C are similar to frets 37. String guides 226 and 228 are similar to string guides 26 and 28 and include grooves 234. Strings 222 are similar to strings 22. Each of strings 222 can also include a ball end, such as, for example, a brass or plastic ball, nut, or ferrule, affixed to one end of the string. A ball end can be used to secure a string to elongate handle 214 at end 216.

Figure 3A:
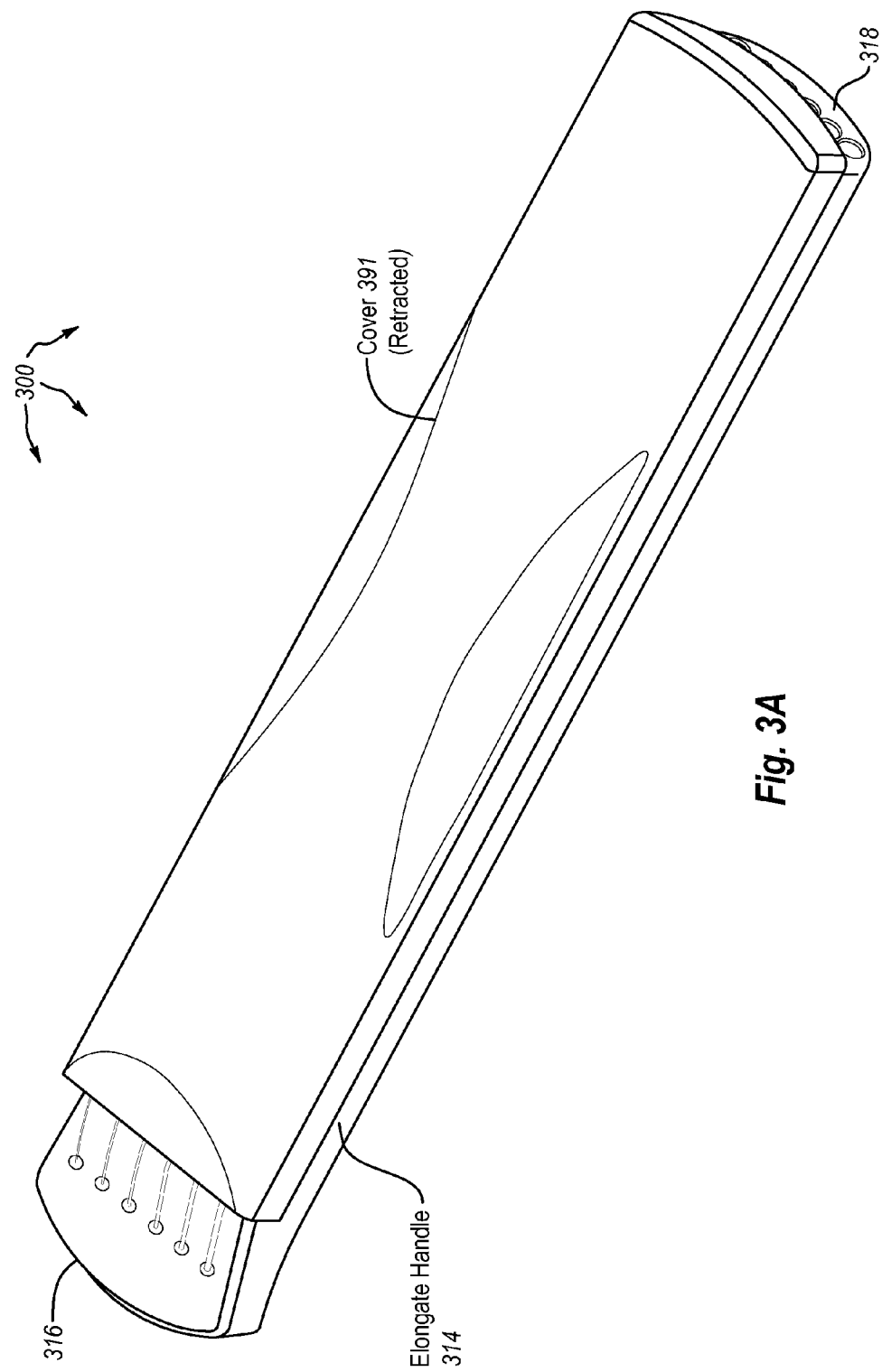
FIGS. 3A and 3B illustrate an example stringed instrument practice device.
Figure 3B:
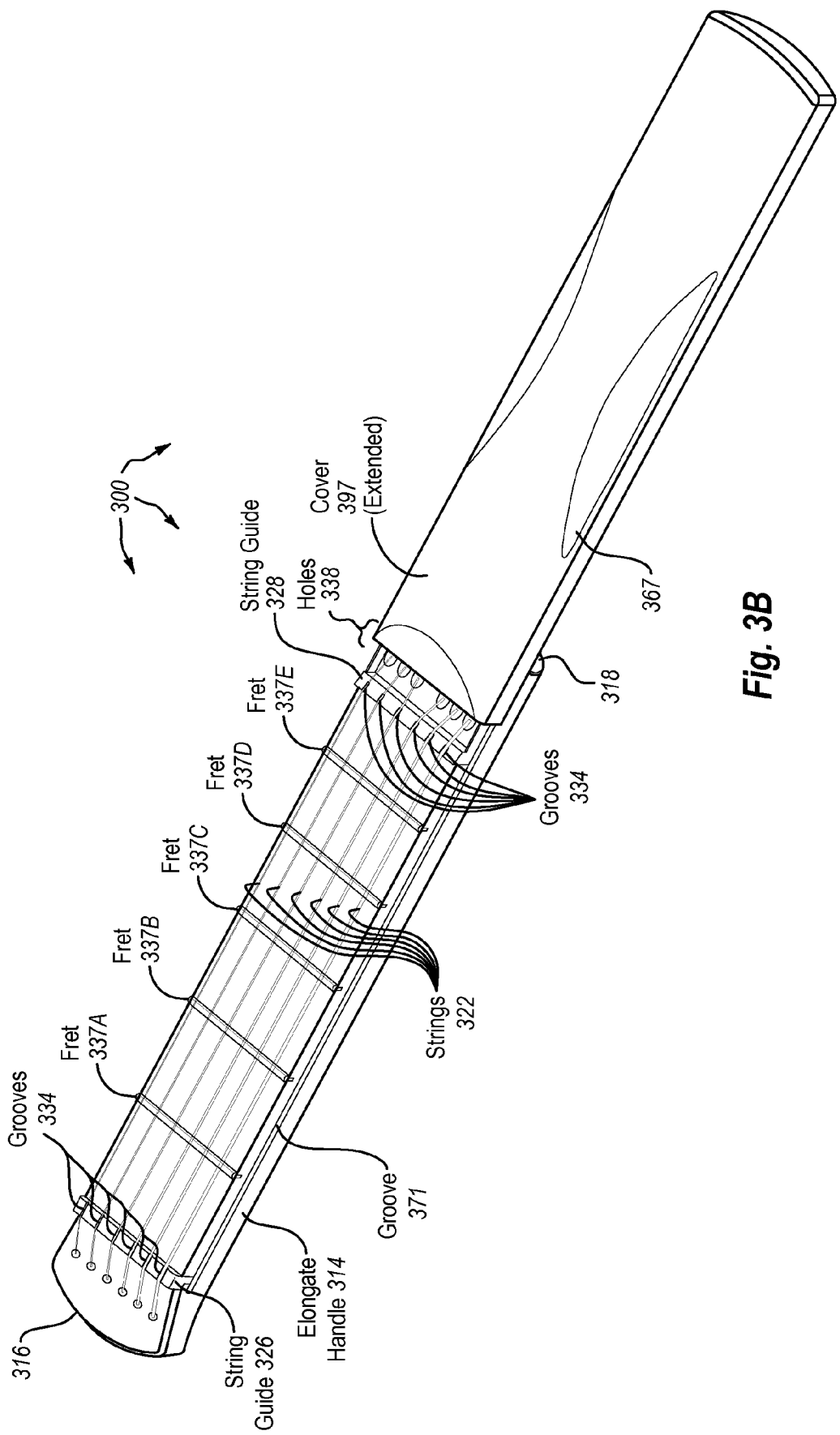

FIGS. 3A and 3B illustrate example stringed instrument practice device 300. FIG. 3A depicts a view of the front side of stringed instrument practice device 300 (or the side of stringed instrument practice device 300 that faces away from a user when practicing). As depicted in FIG. 3A, stringed instrument practice device 300 includes elongate handle 314 (having ends 316 and 318), strings 322, holes 336, and cover 391. In FIG. 3A, cover 391 is retracted to cover other components on the front side of stringed instrument practice device 300.

Turning to FIG. 3B, stringed instrument practice device 300 also includes groove 371. In general, cover 391 can include guide members slidable within groove 371 (and potentially another corresponding groove on the other side of elongate hand 314, not shown). Thus, a user can slide cover 391 towards end 316 (retracting cover 391) or towards end 318 (extending cover 391) when appropriate. In FIG. 3B, cover 391 is extended towards end 318.

When cover 391 is extended, other components on the front side of stringed instrument practice device 300 are exposed. As depicted, these other components include strings 322, frets 337A-337E (five frets), string guide 326, string guide 328, and holes 338. Elongate handle 314 can be constructed from various materials and combines a neck portion along with a fret board on top of the neck portion. Frets 337A-337E are similar to frets 37. String guides 326 and 328 are similar to string guides 26 and 28 and include grooves 334. Strings 322 are similar to strings 22. Each of strings 322 can also include a ball end, such as, for example, a brass or plastic ball, nut, or ferrule, affixed to one end of the string. A ball end can be used to secure a string to elongate handle 314 at end 316.

Figure 4A:
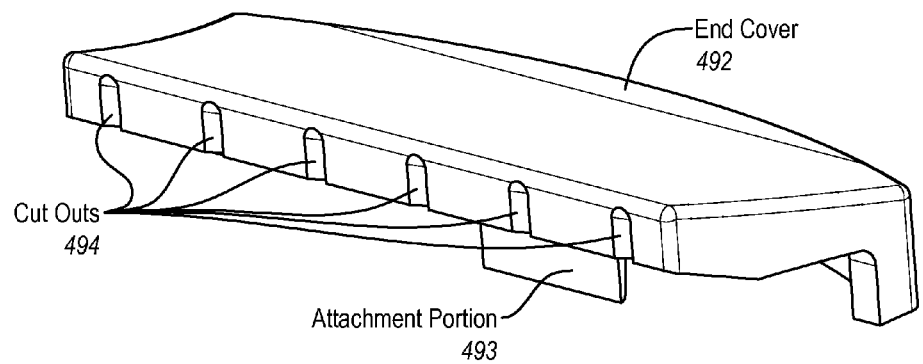
FIGS. 4A and 4B illustrate an end cover for a stringed instrument practice device.
Figure 4B:
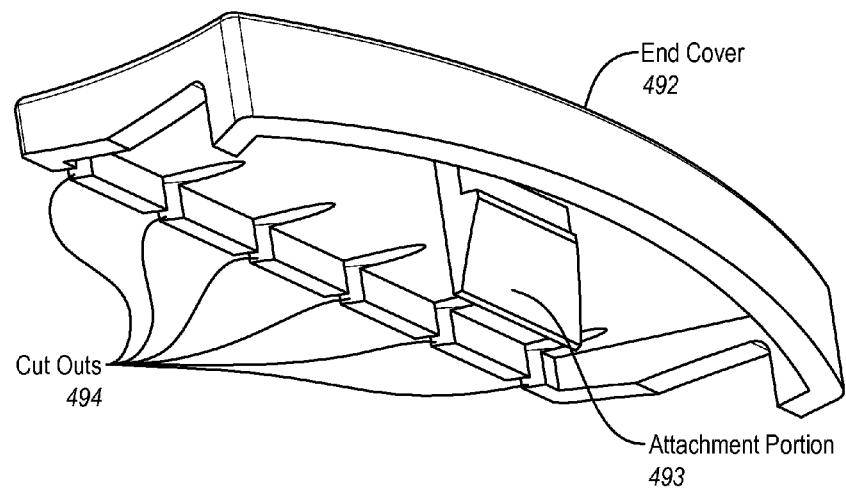

FIGS. 4A and 4B depict an end cover 492 for a stringed instrument practice device. End cover 492 can attach to elongate handle 214 at end 216. Once attached, end cover 492 covers strings 222 between string guide 226 and holes 236. Cut outs 494 allow strings 222 to pass through end cover 492 when end cover 492 is attached to elongate handle. Attachment portion 493 can be used to secure end cover 492 to elongate handle 214.

Figure 4C:
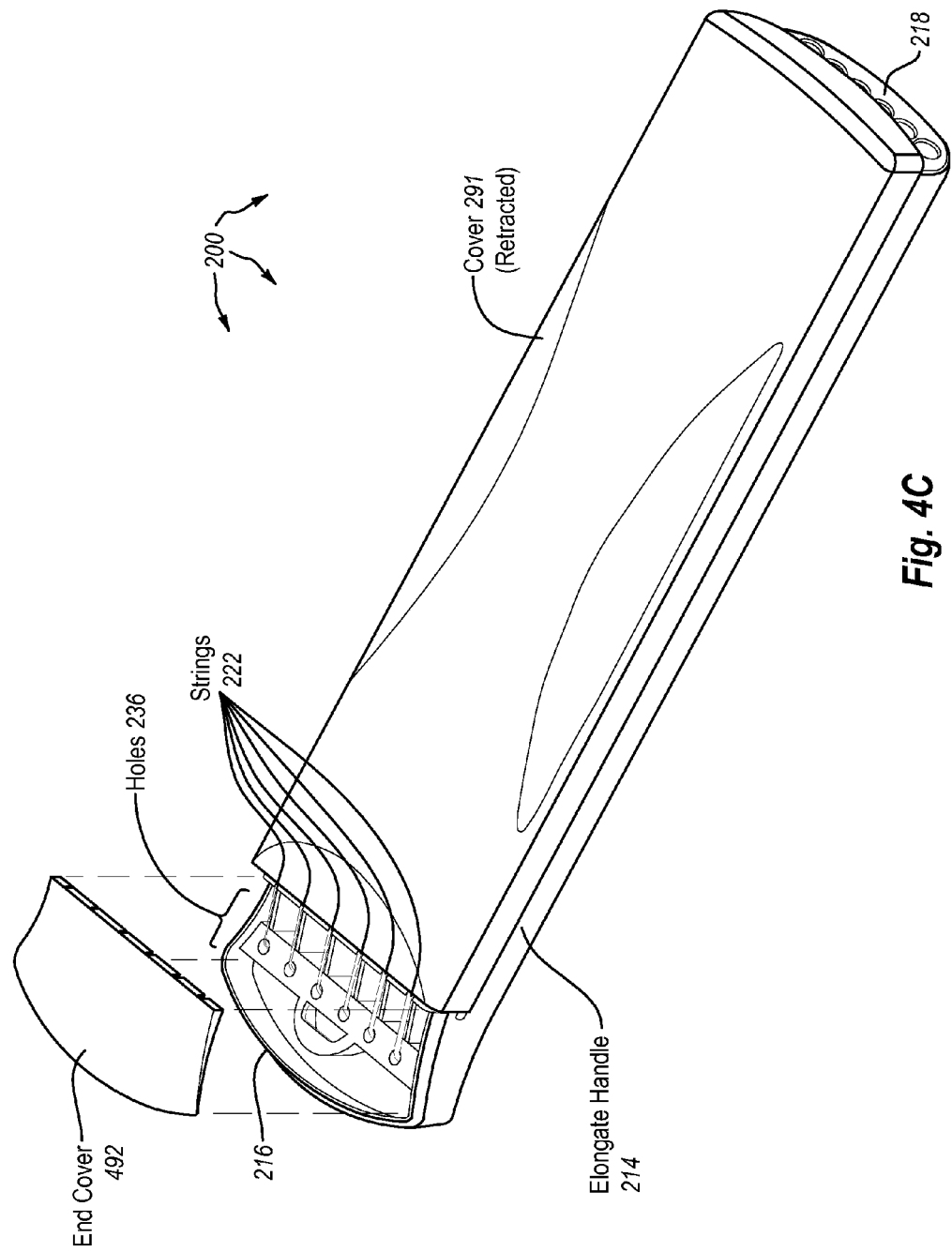
FIGS. 4C-4E illustrate an end cover attached to a stringed instrument practice device.
Figure 4D:
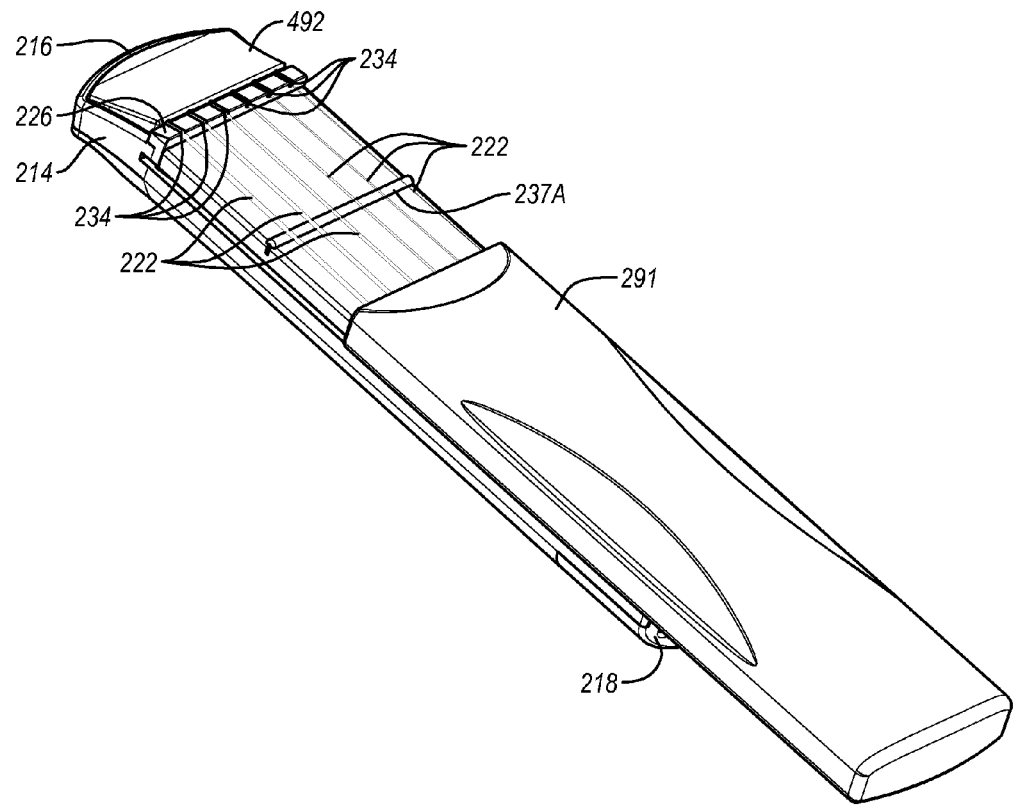
Figure 4E:
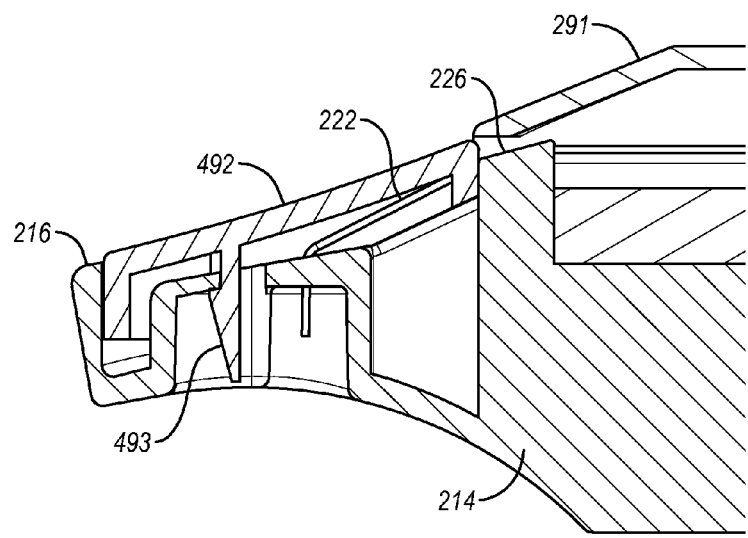

FIGS. 4C-4E illustrate end cover 492 attached to stringed instrument practice device 200. As depicted in FIG. 4C, end cover 492 is placed over strings 222 near end 216 and pressed onto elongate handle 214. Turing to FIG. 4D, end cover 492 is secured to elongate handle 214. When end cover 492 is attached and cover 291 is fully retracted, the full length of strings 222 are covered. Fully covering strings 222 protects strings 222 from undesirable and/or unwanted contact with other objects (e.g., when elongate handle 214 is being put into, removed from, or carried in a pocket or bag). FIG. 4E depicts a side cut away view of elongate handle 214. Applying pressure (towards end 218) to attachment portion 493 can be used to release end cover 492 from elongate handle 214. End cover 492 can be removed to provide access to strings 222.

Figure 5:
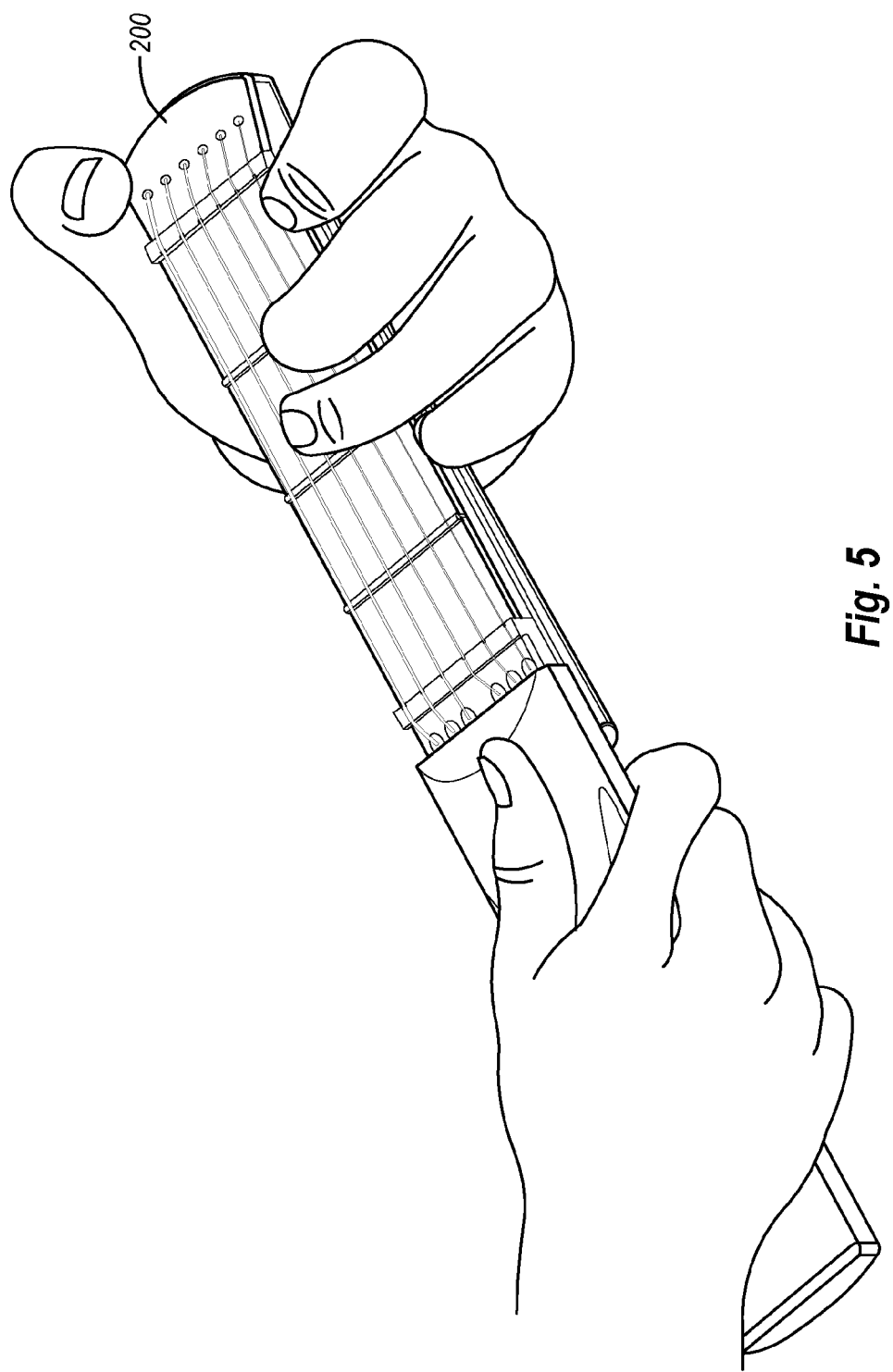
FIG. 5 illustrates a user practicing using the stringed instrument practice of FIGS. 2A and 2B.

FIG. 5 illustrates a user practicing using stringed instrument practice device 200.

Figure 6A:
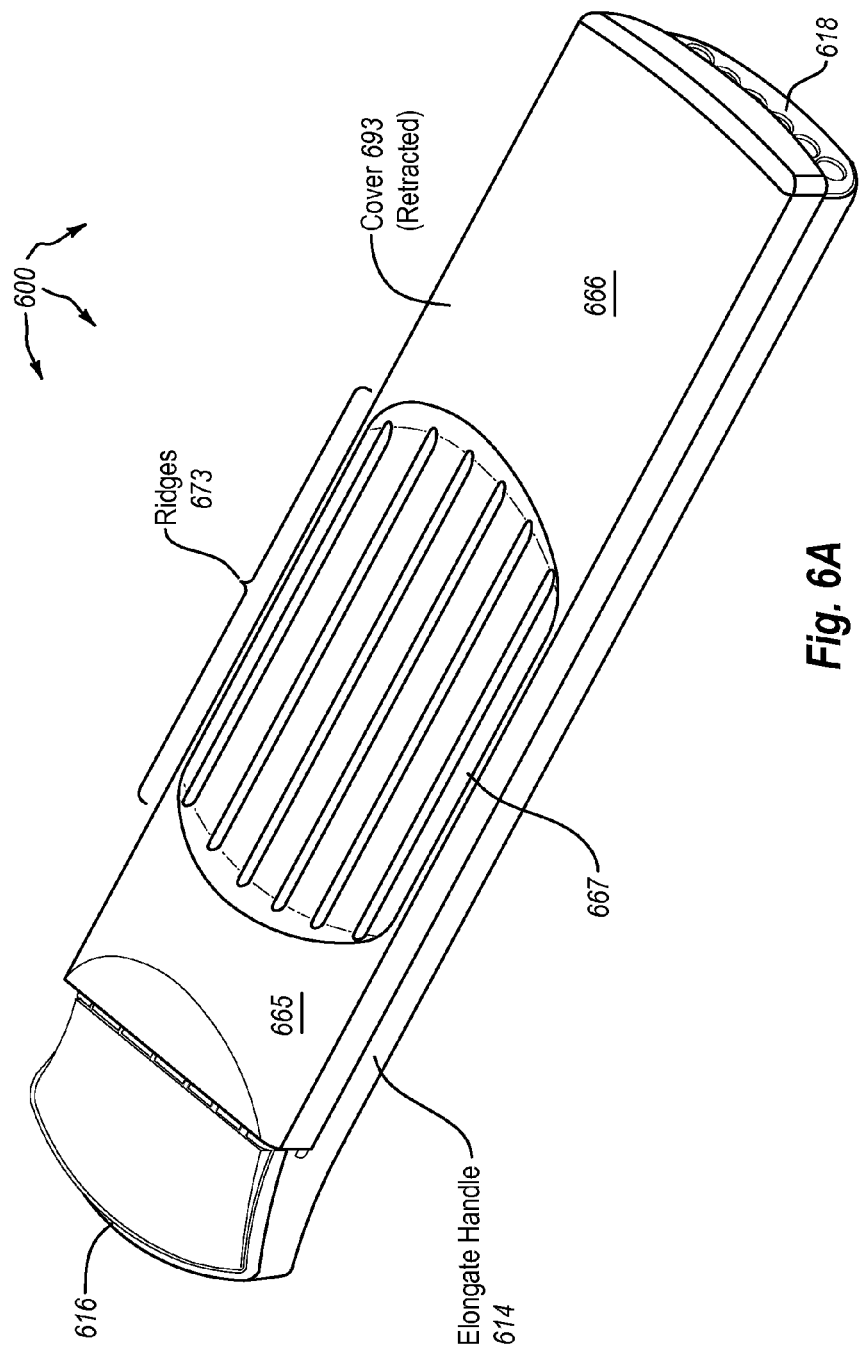
FIGS. 6A and 6B illustrate an example stringed instrument practice device.
Figure 6B:
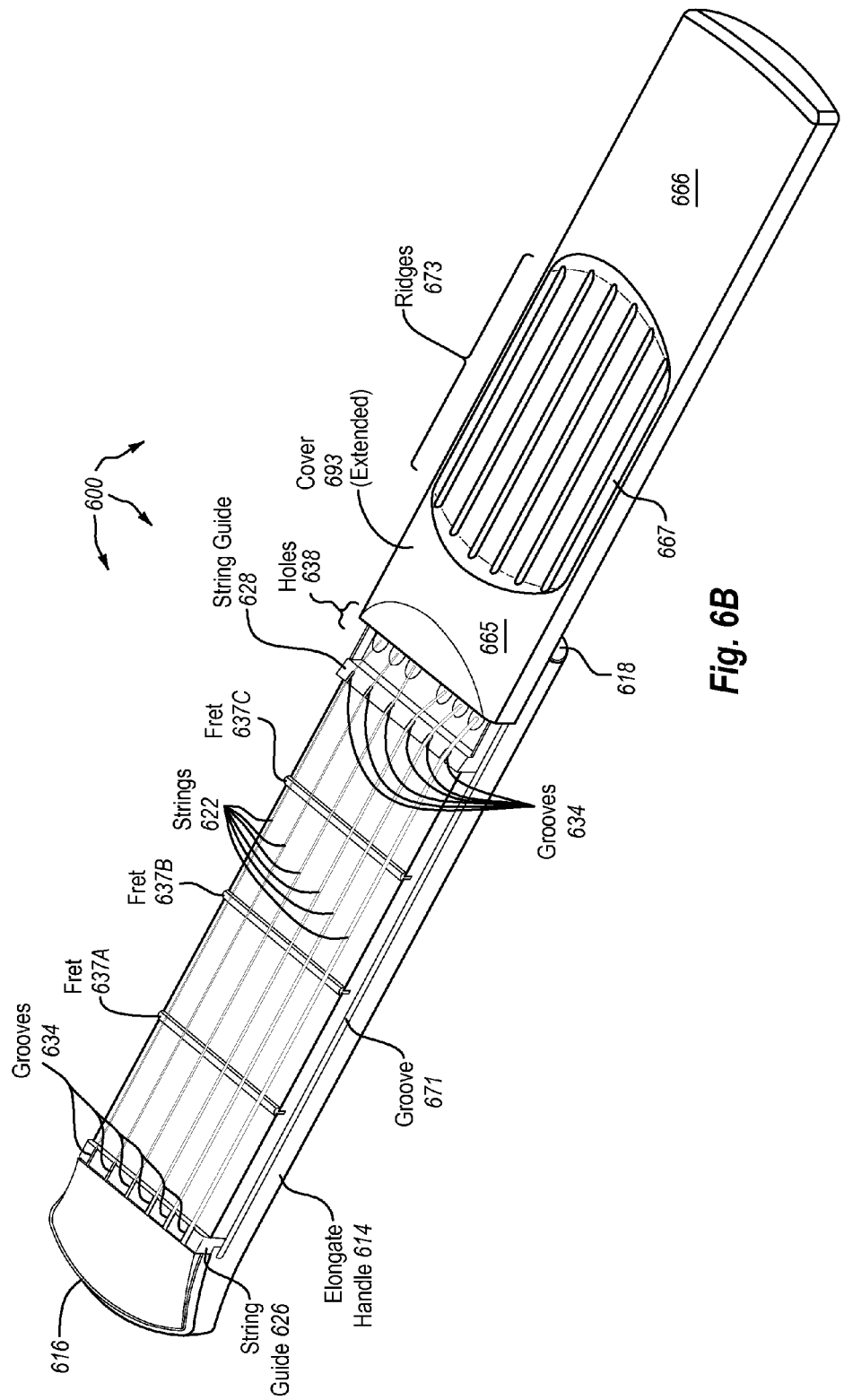

FIGS. 6A and 6B illustrate example stringed instrument practice device 600. FIG. 6A depicts a view of the front side of stringed instrument practice device 600 (or the side of stringed instrument practice device 600 that faces away from a user when practicing). As depicted in FIG. 6A, stringed instrument practice device 600 includes elongate handle 614 (having ends 616 and 618) and cover 693. Cover 693 is retracted to cover other components on the front side of stringed instrument practice device 600 (including strings 622 in FIG. 6B).

As further depicted, cover 693 includes portions 665, 666, and 667. The height of portion 667 can be lower relative to portions 665 and 666. Ridges 673 are included within portion 667. Ridges 673 can be configured with a size, height, and spacing to simulate strings similar to strings 622. For example, the spacing between individual ridges of ridges 673 can be essentially the same as the spacing between individual strings of strings 622. In some embodiments, the height of ridges 673 are lower relatively to portions 665 and 666 of cover 693. This reduces the likelihood of ridges 673 catching on external objects FIG. 6B depicts cover 693 extended towards end 618. When cover 693 is extended, other components on the front side of stringed instrument practice device 600 are exposed. As depicted in FIG. 6B, stringed instrument practice device 600 further includes strings, 622, frets 637A-637C (three frets), string guide 628, and holes 638. Elongate handle 614 can be constructed from various materials and combines a neck portion along with a fret board on top of the neck portion.

Elongate handle 614 also includes groove 671. Groove 671 runs essentially between just past string guide 626 and end 618 on (for a right handed device) the upside of elongate handle 614 (i.e., the side of elongate handle 614 that faces up when a user is practicing). Another similarly configured groove (not shown in FIG. 6B) can be included on the downside of elongate handle 614 (i.e., opposite of groove 671 or, for a right handed device, the side of elongate handle 614 that faces down when a user is practicing). Cover 693 can include guide members that extend into groove 671 and into the similarly configured groove on the downside of elongate handle 614. Thus, cover 693 is slidable within groove 671 and the other similarly configured groove. The guide members reduce the possibility of cover 693 disengaging from elongate handle 614 due to forces other than those moving cover 693 essentially parallel to the grooves (e.g., sliding cover 693 towards end 616 or towards end 618).

When cover 693 is extended, ridges 673 can be positioned such that a user of stringed instrument practice device 600 can use ridges 673 to simulate strumming (e.g., the strings of guitar, bass, banjo, etc.).

In some embodiments, cover 693, including ridges 673, is a single (e.g., molded or extruded) plastic piece.

Figure 7A:
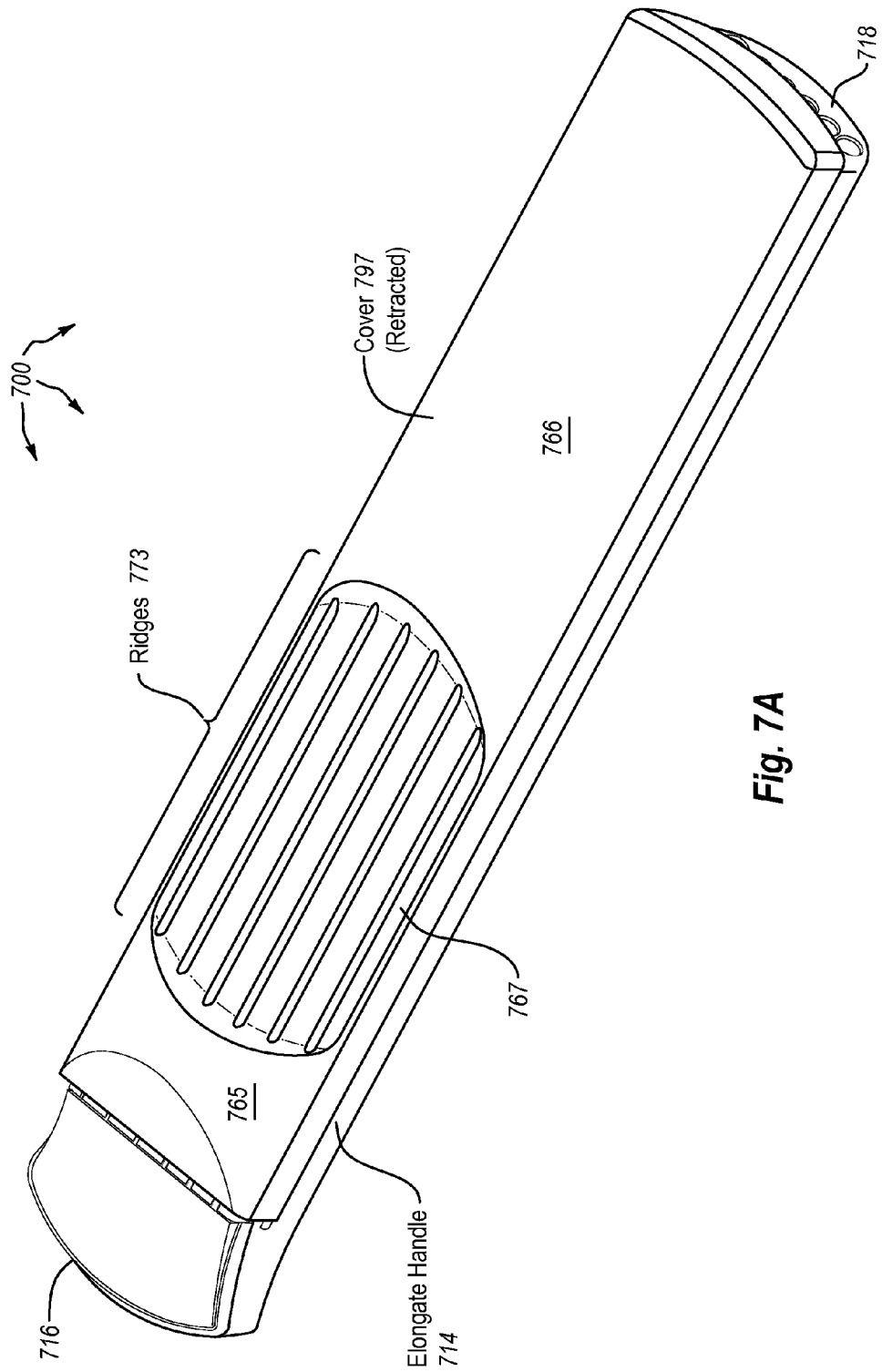
FIGS. 7A and 7B illustrate an example stringed instrument practice device.
Figure 7B:
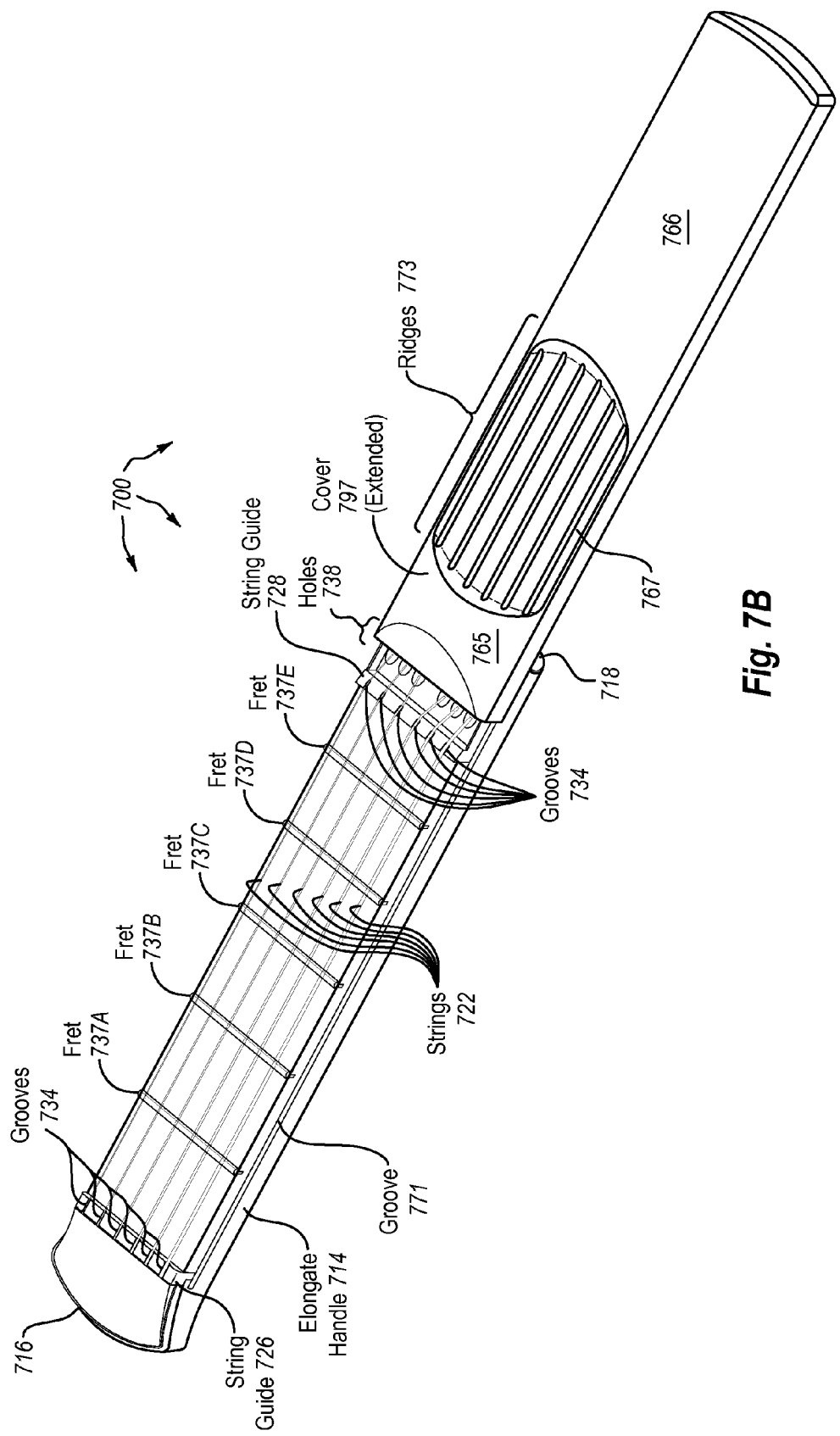

FIGS. 7A and 7B illustrate example stringed instrument practice device 700. FIG. 7A depicts a view of the front side of stringed instrument practice device 700 (or the side of stringed instrument practice device 700 that faces away from a user when practicing). As depicted in FIG. 7A, stringed instrument practice device 700 includes elongate handle 714 (having ends 716 and 718), and cover 797. Cover 797 is retracted to cover other components on the front side of stringed instrument practice device 700 (including strings 722 in FIG. 7B).

As further depicted, cover 793 includes portions 765, 766, and 767. The height of portion 767 can be lower relative to portions 765 and 766. Ridges 773 are included within portion 767. Ridges 773 can be configured with a size, height, and spacing to simulate strings similar to strings 722. For example, the spacing between individual ridges of ridges 773 can be essentially the same as the spacing between individual strings of strings 722. In some embodiments, the height of ridges 773 are lower relatively to portions 765 and 766 of cover 797. This reduces the likelihood of ridges 773 catching on external objects FIG. 7B depicts cover 797 extended towards end 718. When cover 797 is extended, other components on the front side of stringed instrument practice device 700 are uncovered. As depicted in FIG. 7B, stringed instrument practice device 700 further includes strings 722, frets 737A-737E (five frets), string guide 728, and holes 738. Elongate handle 714 can be constructed from various materials and combines a neck portion along with a fret board on top of the neck portion.

Elongate handle 714 also includes groove 771. Groove 771 runs essentially between just past string guide 726 and end 718 on the upside of elongate handle 714 (i.e., the side of elongate handle 714 that, for a right handed device, faces up when a user is practicing). Another similarly configured groove (not shown in FIG. 7B) can be included on the downside of elongate handle 714 (i.e., opposite of groove 771 or the side of elongate handle 714 that, for a right handed device, faces down when a user is practicing). Cover 797 can include guide members that extend into groove 771 and into the similarly configured groove on the downside of elongate handle 714. Thus, cover 797 is slidable within groove 771 and the other similarly configured groove. The guide members reduce the possibility of cover 797 disengaging from elongate handle 714 due to forces other than those moving cover 797 essentially parallel to the grooves (e.g., sliding cover 797 towards end 716 or towards end 718).

When cover 797 is extended, ridges 773 can be positioned such that a user of stringed instrument practice device 700 can use ridges 773 to simulate strumming (e.g., the strings of guitar, bass, banjo, etc.).

In some embodiments, cover 797, including ridges 773, is a single (e.g., molded or extruded) plastic piece.

Figure 8:
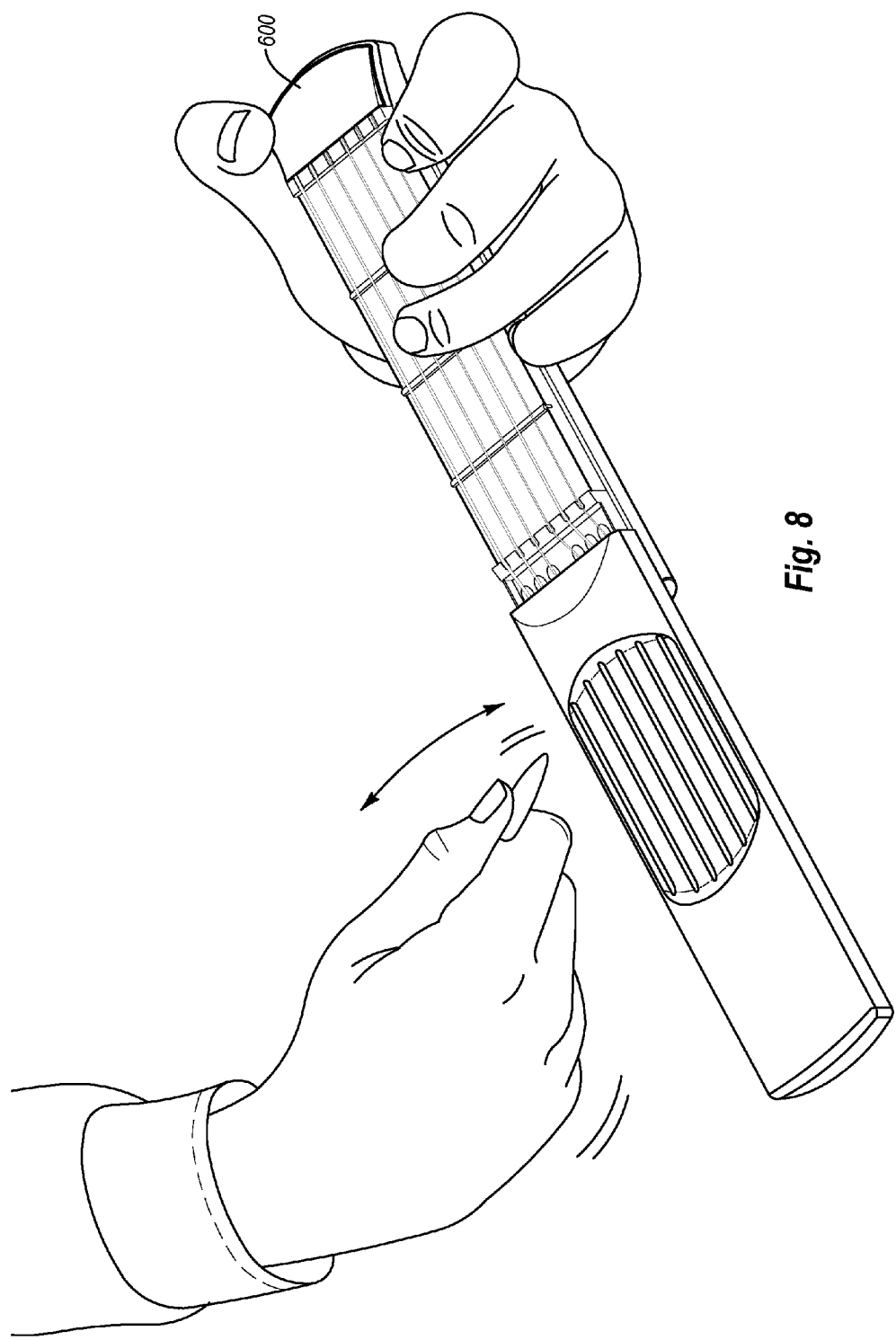
FIG. 8 illustrates a user practicing using the stringed instrument practice device of FIGS. 6A and 6B.

FIG. 8 illustrates a user practicing using stringed instrument practice device 600.

Figure 9A:
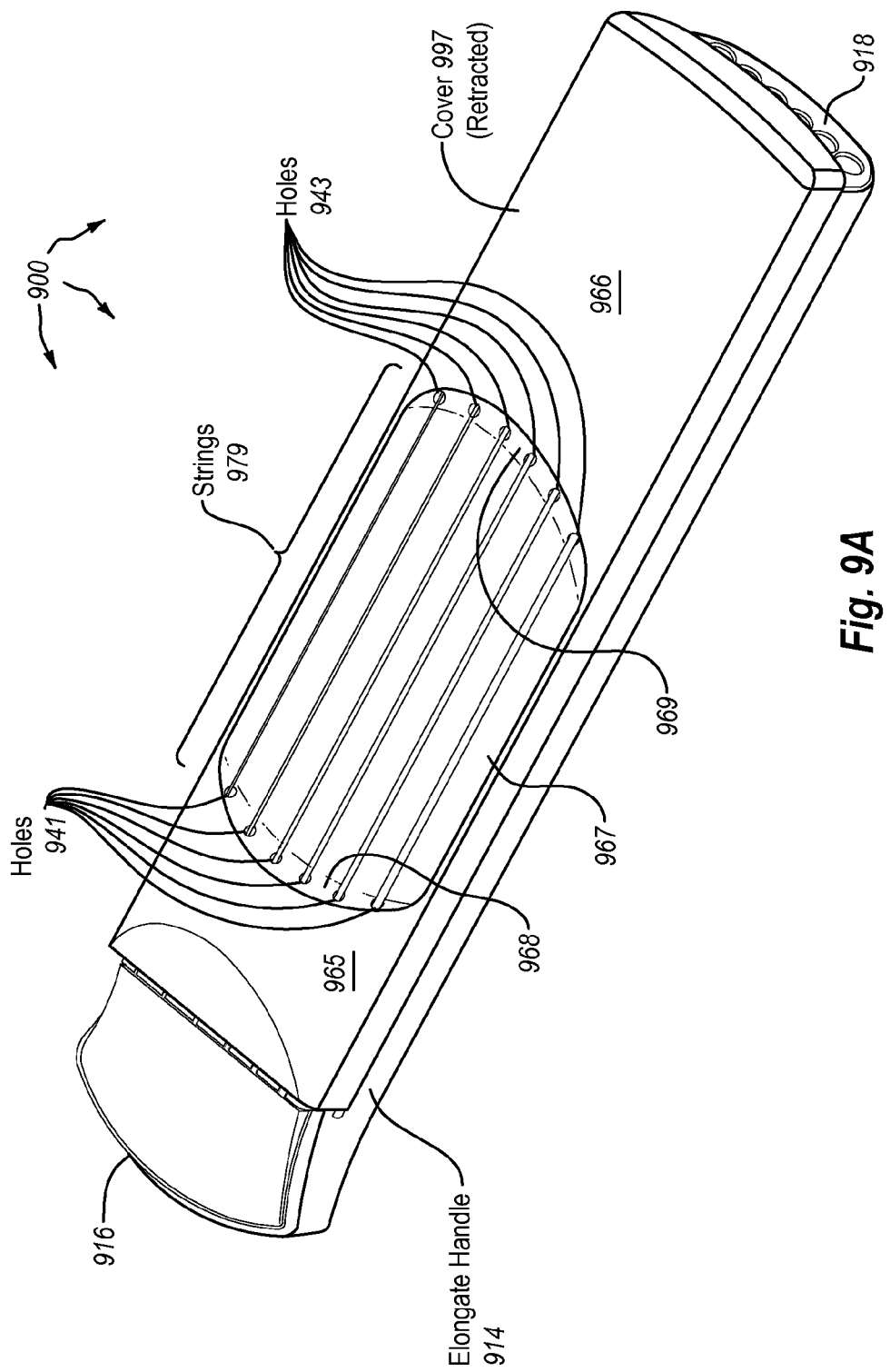
FIGS. 9A and 9B illustrate an example stringed instrument practice device.
Figure 9B:
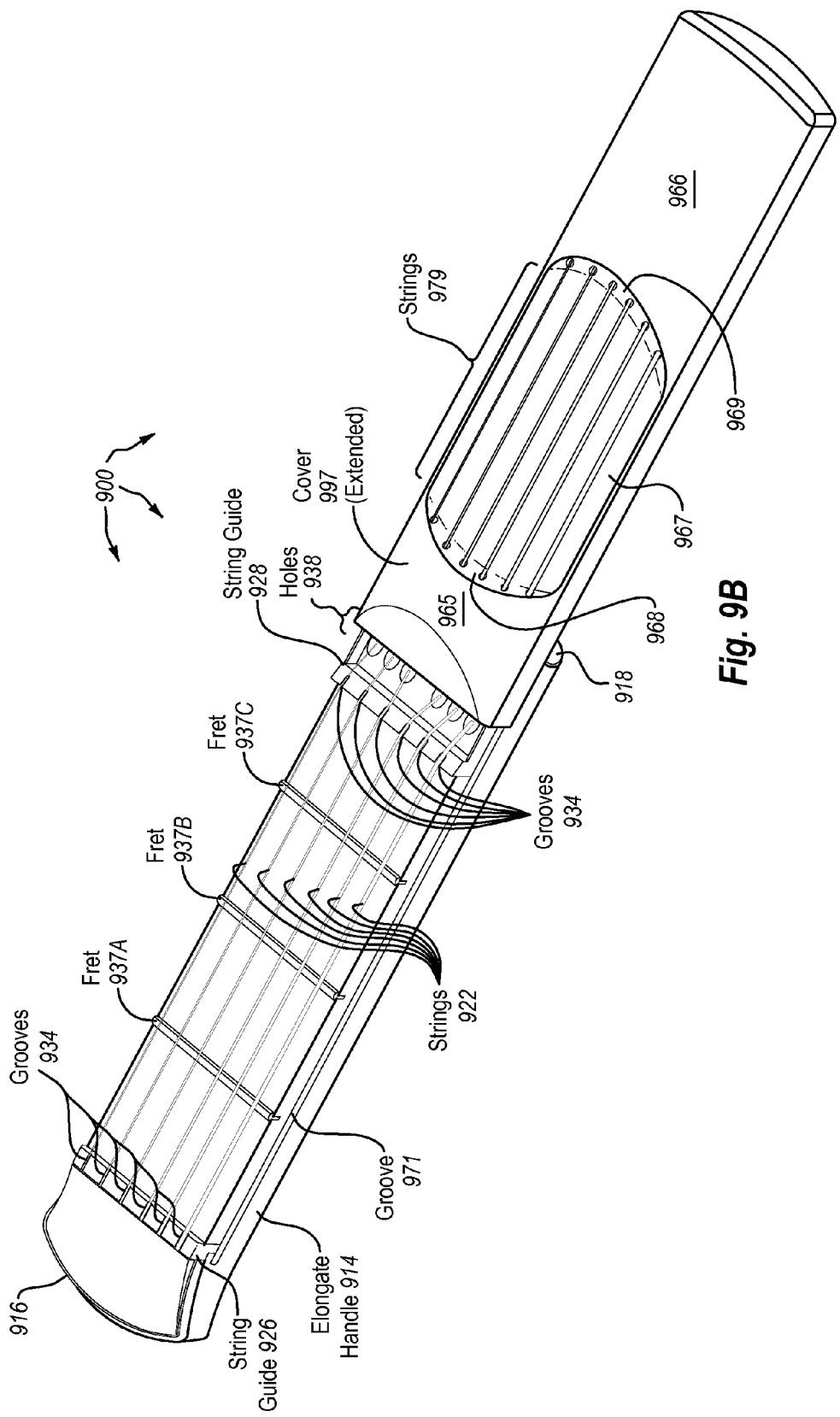

FIGS. 9A and 9B illustrate example stringed instrument practice device 900. FIG. 9A depicts a view of the front side of stringed instrument practice device 900 (or the side of stringed instrument practice device 900 that faces away from a user when practicing). As depicted in FIG. 9A, stringed instrument practice device 900 includes elongate handle 914 (having ends 916 and 918) and cover 997. Cover 997 is retracted to cover other components on the front side of stringed instrument practice device 900 (including strings 922 in FIG. 9B). As further depicted, cover 997 includes portions 965, 966, 967, 968, and 969. Portion 968 further includes holes 941. Portion 969 further includes holes 943. Strings 979 (e.g., musical instrument strings) pass through holes 941 and pass through holes 943.

The height of portion 967 can be lower relative to portions 965 and 966. Strings 979 are included within portion 967. Strings 979 can be configured with a type, size, height, and spacing similar to strings 922. For example, the spacing between individual strings of strings 979 can be essentially the same as the spacing between individual strings of strings 922. In some embodiments, the height of strings 979 is lower relatively to portions 965 and 966 of cover 997. This reduces the likelihood of strings 979 catching on external objects.

FIG. 9B depicts cover 997 extended towards end 918. When cover 997 is extended, other components on the front side of stringed instrument practice device 900 are uncovered. As depicted in FIG. 9B, stringed instrument practice device 900 further includes strings 922, frets 937A-937C (three frets), string guide 928, and holes 938. Elongate handle 914 can be constructed from various materials and combines a neck portion along with a fret board on top of the neck portion.

Elongate handle 914 also includes groove 971. Groove 971 runs essentially between just past string guide 926 and end 918 on the upside of elongate handle 914 (i.e., the side of elongate handle 914 that, for a right handed device, faces up when a user is practicing). Another similarly configured groove (not shown in FIG. 9B) can be included on the downside of elongate handle 914 (i.e., opposite of groove 971 or, for a right handed device, the side of elongate handle 914 that faces down when a user is practicing). Cover 997 can include guide members that extend into groove 971 and into the similarly configured groove on the downside of elongate handle 914. Thus, cover 997 is slidable within groove 971 and the other similarly configured groove. The guide members reduce the possibility of cover 997 disengaging from elongate handle 914 due to forces other than those moving cover 997 essentially parallel to the grooves (e.g., sliding cover 997 towards end 916 or towards end 918).

When cover 997 is extended, strings 979 can be positioned such that a user of stringed instrument practice device 900 can strum strings 979 (e.g., to simulate strumming the strings of a guitar, bass, banjo, etc.).

In some embodiments, cover 997 is a single (e.g., molded or extruded) plastic piece. Strings 979 can be attached to cover 997 separately.

Figure 10A:
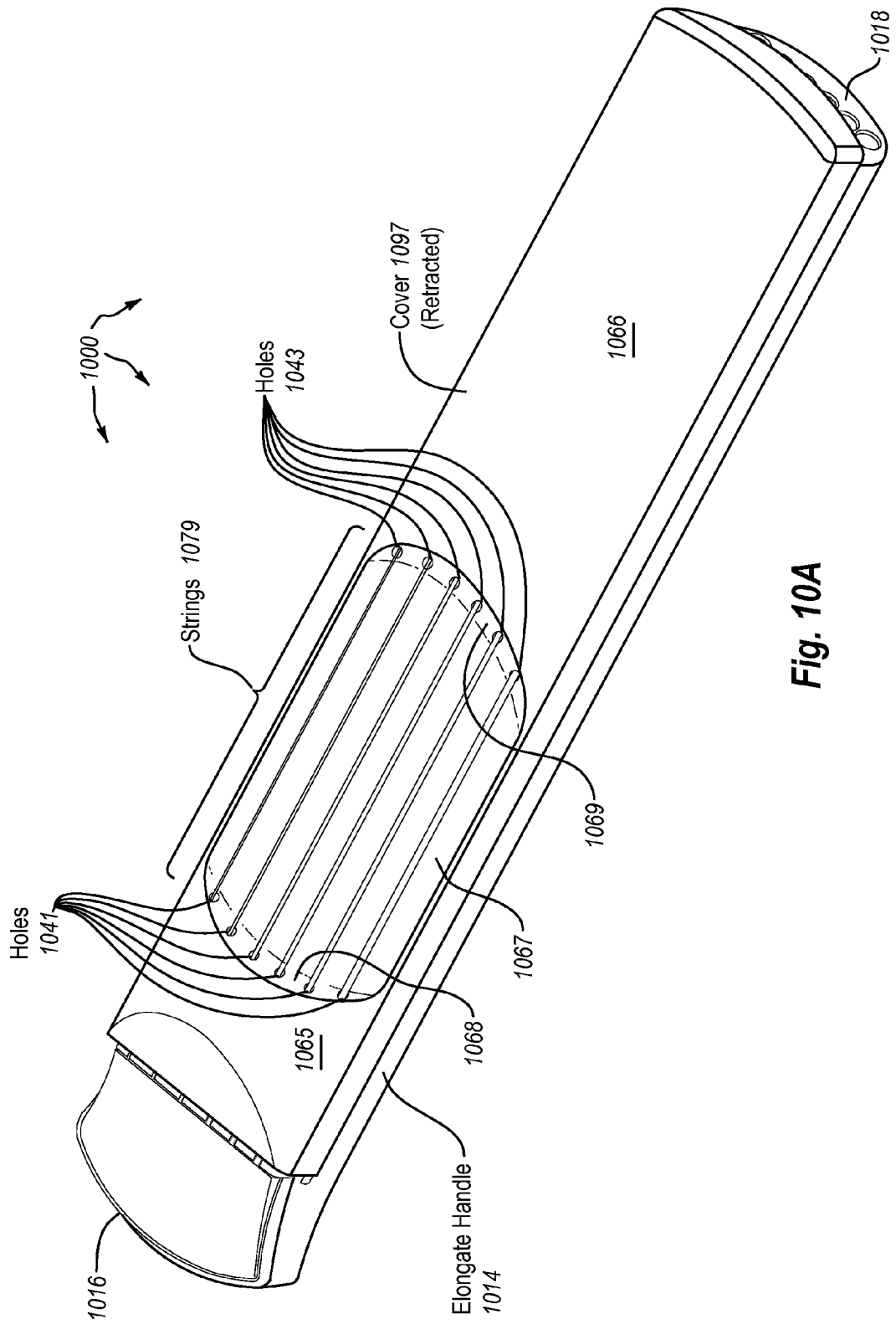
FIGS. 10A and 10B illustrate an example stringed instrument practice device.
Figure 10B:
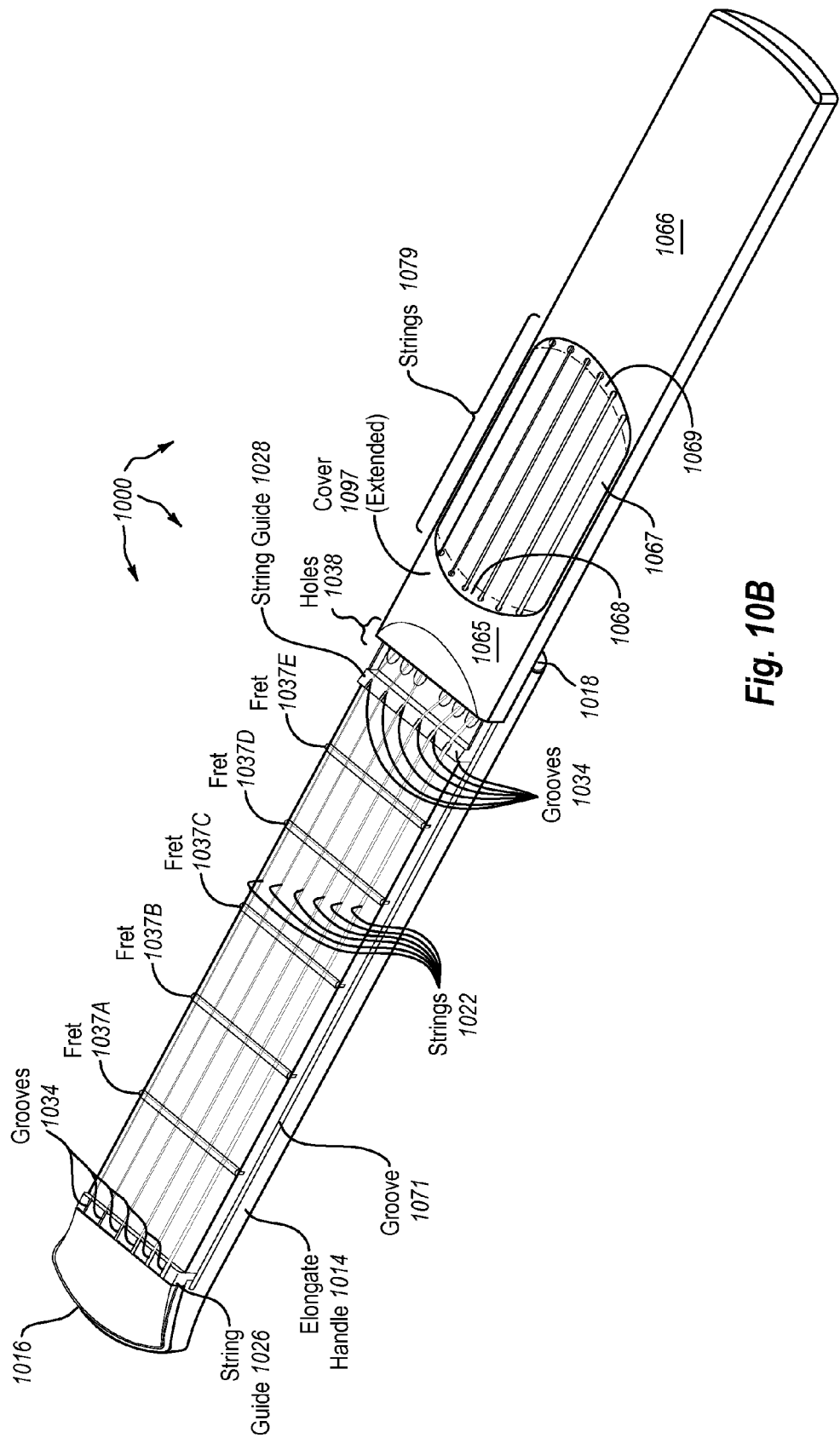

FIGS. 10A and 10B illustrate example stringed instrument practice device 1000. FIG. 10A depicts a view of the front side of stringed instrument practice device 1000 (or the side of stringed instrument practice device 1000 that faces away from a user when practicing). As depicted in FIG. 10A, stringed instrument practice device 1000 includes elongate handle 1014 (having ends 1016 and 1018) and cover 1097. Cover 1097 is retracted to cover other components on the front side of stringed instrument practice device 1000 (including strings 1022 in FIG. 10B). As further depicted, cover 1097 includes portions 1065, 1066, 1067, 1068, and 1069. Portion 1068 further includes holes 1041. Portion 1069 further includes holes 1043. Strings 1079 pass through holes 1041 and pass through holes 1043.

The height of portion 1067 can be lower relative to portions 1065 and 1066. Strings 1079 are included within portion 1067. Strings 1079 can be configured with a type, size, height, and spacing similar to strings 1022. For example, the spacing between individual strings of strings 1079 can be essentially the same as the spacing between individual strings of strings 1022. In some embodiments, the height of strings 1079 is lower relatively to portions 1065 and 1066 of cover 1097. This reduces the likelihood of strings 1079 catching on external objects.

FIG. 10B depicts cover 1097 extended towards end 1018. When cover 1097 is extended, other components on the front side of stringed instrument practice device 1000 are uncovered. As depicted in FIG. 10B, stringed instrument practice device 1000 further includes strings, 1022, frets 1037A-1037C (five frets), string guide 1028, and holes 1038. Elongate handle 1014 can be constructed from various materials and combines a neck portion along with a fret board on top of the neck portion.

Elongate handle 1014 also includes groove 1071. Groove 1071 runs essentially between just past string guide 1026 and end 1018 on the upside of elongate handle 614 (i.e., for a right handed device, the side of elongate handle 1014 that faces up when a user is practicing). Another similarly configured groove (not shown in FIG. 10B) can be included on the downside of elongate handle 1014 (i.e., opposite of groove 1071 or, for a right handed device, the side of elongate handle 1014 that faces down when a user is practicing). Cover 1097 can include guide members that extend into groove 1071 and into the similarly configured groove on the downside of elongate handle 1014. Thus, cover 1097 is slidable within groove 1071 and the other similarly configured groove. The guide members reduce the possibility of cover 1097 disengaging from elongate handle 1014 due to forces other than those moving cover 1097 essentially parallel to the grooves (e.g., sliding cover 1097 towards end 1016 or towards end 1018).

When cover 1097 is extended, strings 1079 can be positioned such that a user of stringed instrument practice device 1000 can strum strings 1079 (e.g., to simulate strumming the strings of a guitar, bass, banjo, etc.).

In some embodiments, cover 1097 is a single (e.g., molded or extruded) plastic piece. Strings 1079 can be attached to cover 1097 separately.

FIGS. 11A-11D illustrate various views of stringed instrument practice device cover 1197. Cover 1197 is an example of a cover similar to covers 997 and 1097. Stringed instrument practice device cover 1197 can be sized for different lengths of elongate handle (e.g., elongate handles having various different numbers of frets).

FIG. 11A depicts cover 1197 turned over (relative to FIGS. 9A, 9B, 10A, and 10B) and fully disengaged from an elongate handle. As depicted, each of strings 1179 has a ball end 1152 on one end and is tied in a knot on the other end. Springs 1151 and 1153 can maintain some amount of tension on strings 1179 and can compensate for natural loss of tension in strings 1179 during use.

To attach a string 1179 to cover 1197, the string 1179 can be drawn through a corresponding 1151 and then through a corresponding hole 1143. The string 1179 can then be drawn through a corresponding hole 1141 and then through a corresponding spring 1153. After being drawn through spring 1153, the string 1179 can be tied into a knot 1154 (FIG. 11B illustrates a close up of a knot). Knots 1154 can be of a size larger than the diameter of springs 1153. Ball ends 1152 (FIG. 11C illustrates a close up of a ball end) can also be of a size large than the diameter of springs 1151. Accordingly, the springs 1151 and 1153 push back against ball ends 1152 and knots 1154 respectively to keep tension on strings 1179.

In alternate embodiments, strings 1179 do not include ball ends 1152. Instead, strings 1179 are tied in a knot on both ends. The knots replacing ball ends 1152 can be of a size larger than the diameter of springs 1151.

Figure 11D:
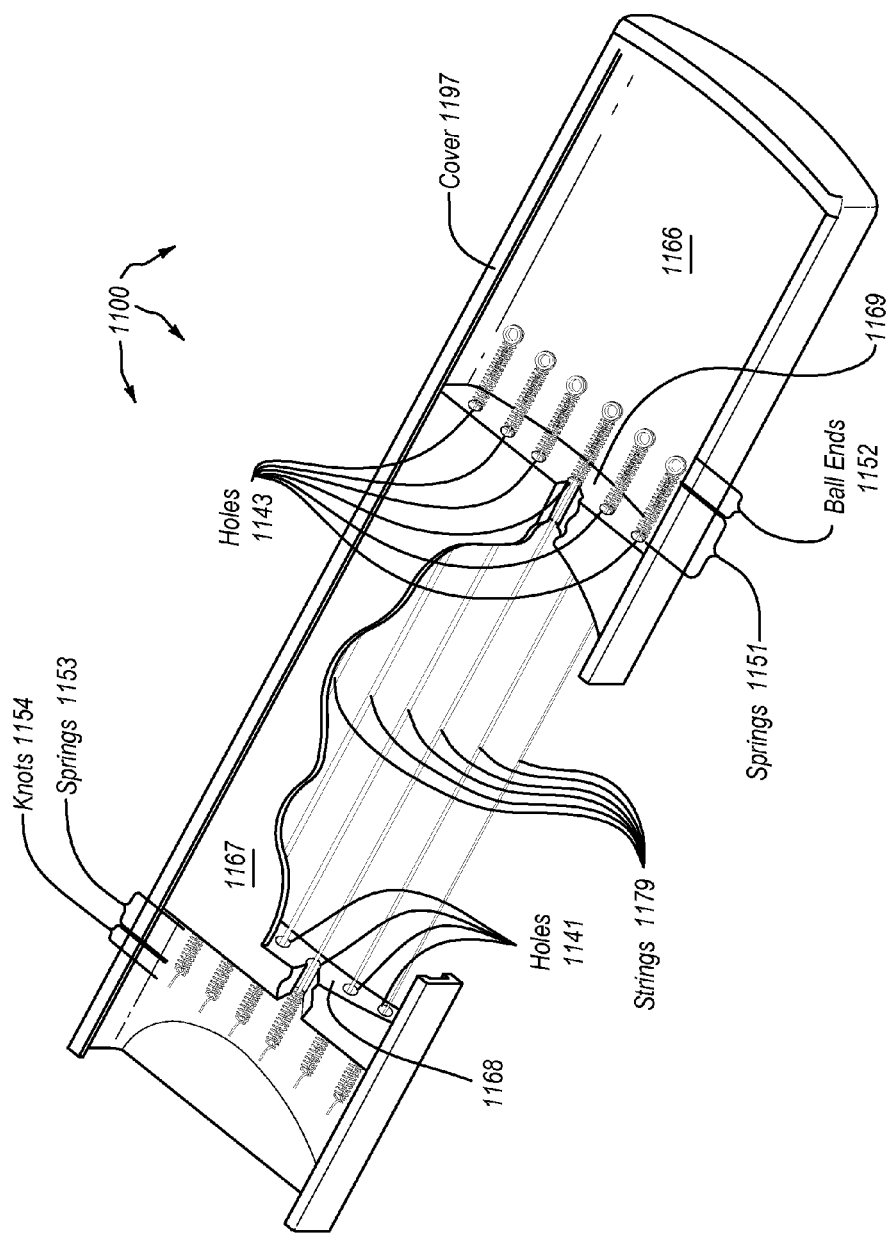

FIG. 11D depicts cover 1197 with part of portion 1167 cut away. Some of the holes 1141 are depicted.

Figure 12:
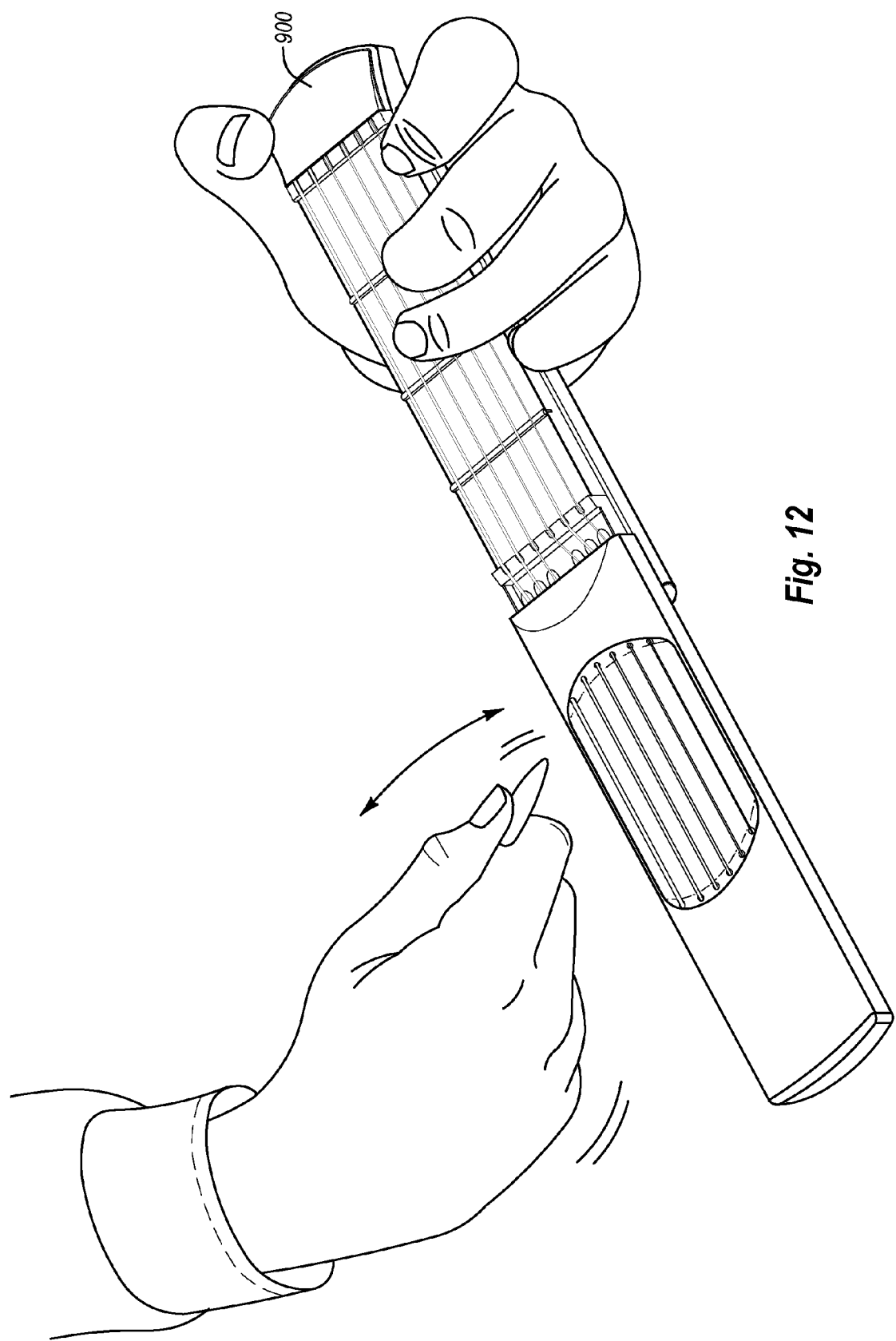
FIG. 12 illustrates a user practicing using the stringed instrument practice device of FIGS. 9A and 9B.

FIG. 12 illustrates a user practicing using stringed instrument practice device 900.

In some embodiments of the invention, grooves, such as, for example, groves 271, 371, 671, 771, 971, and 1071, have variable length depths. That is, the depth of a groove can differ at different locations on the side of an elongate handle. Thus, a groove can transition from one depth to another. The length of cover guide members (e.g., on any of covers 291, 391, 693, 797, 997, and 1097) can be selected so that a corresponding cover slides with different resistive biases based on the groove depth. Differing resistive biases can be used to indicate to a user when a cover is near to being fully removed from an elongate handle.

Figure 13A:
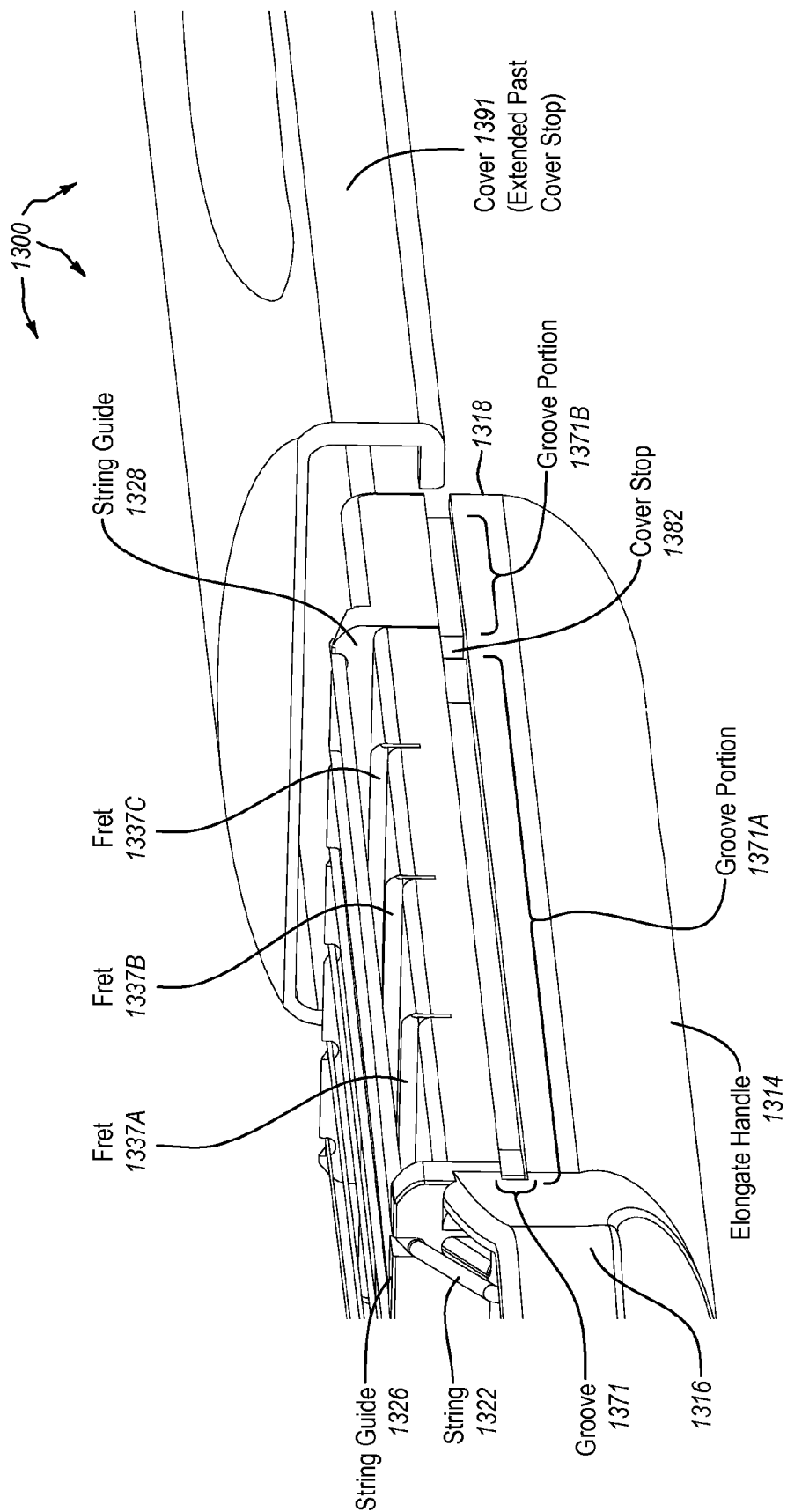
FIGS. 13A-13M illustrate various views of a stringed instrument practice device.
Figure 13B:
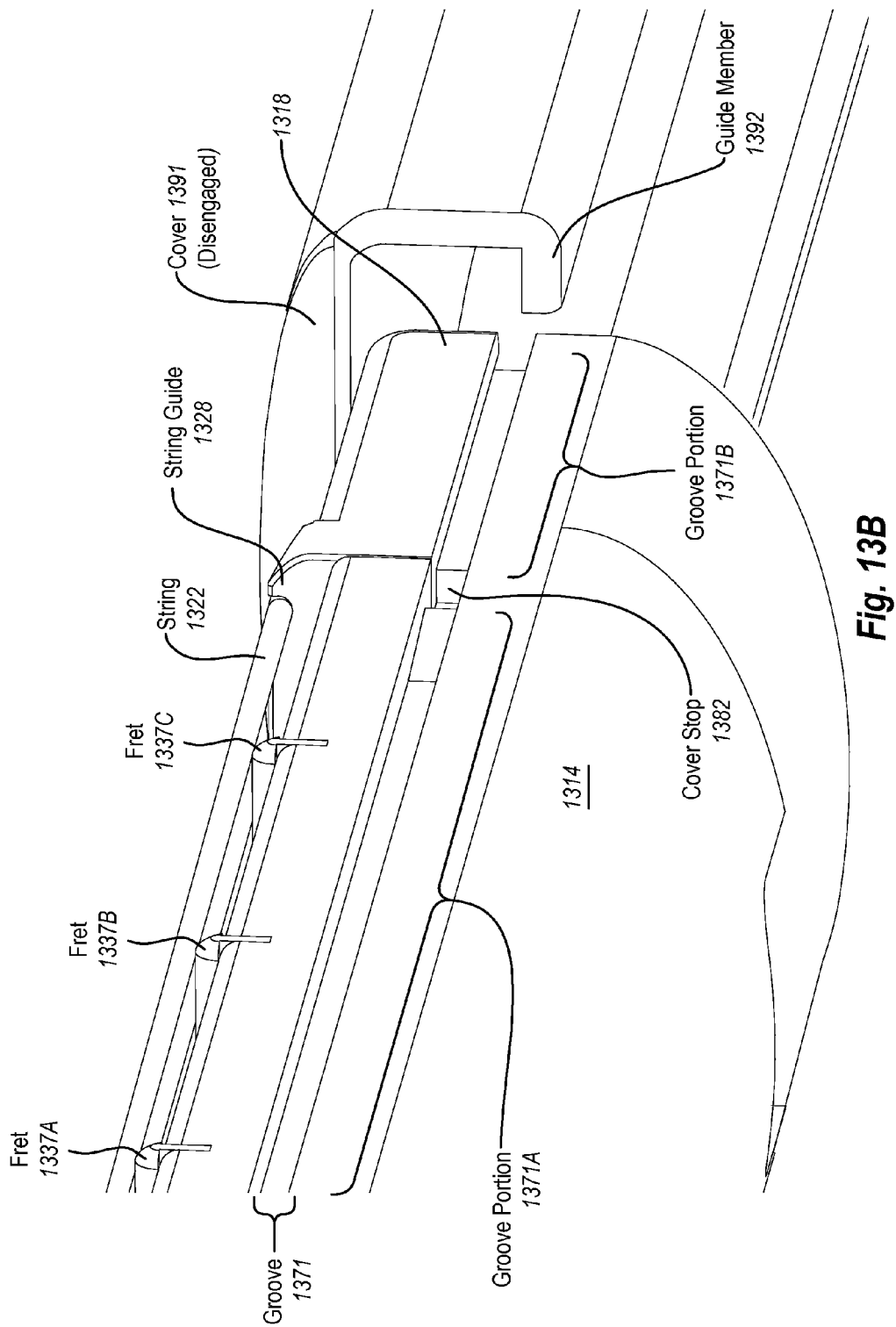
Figure 13C:
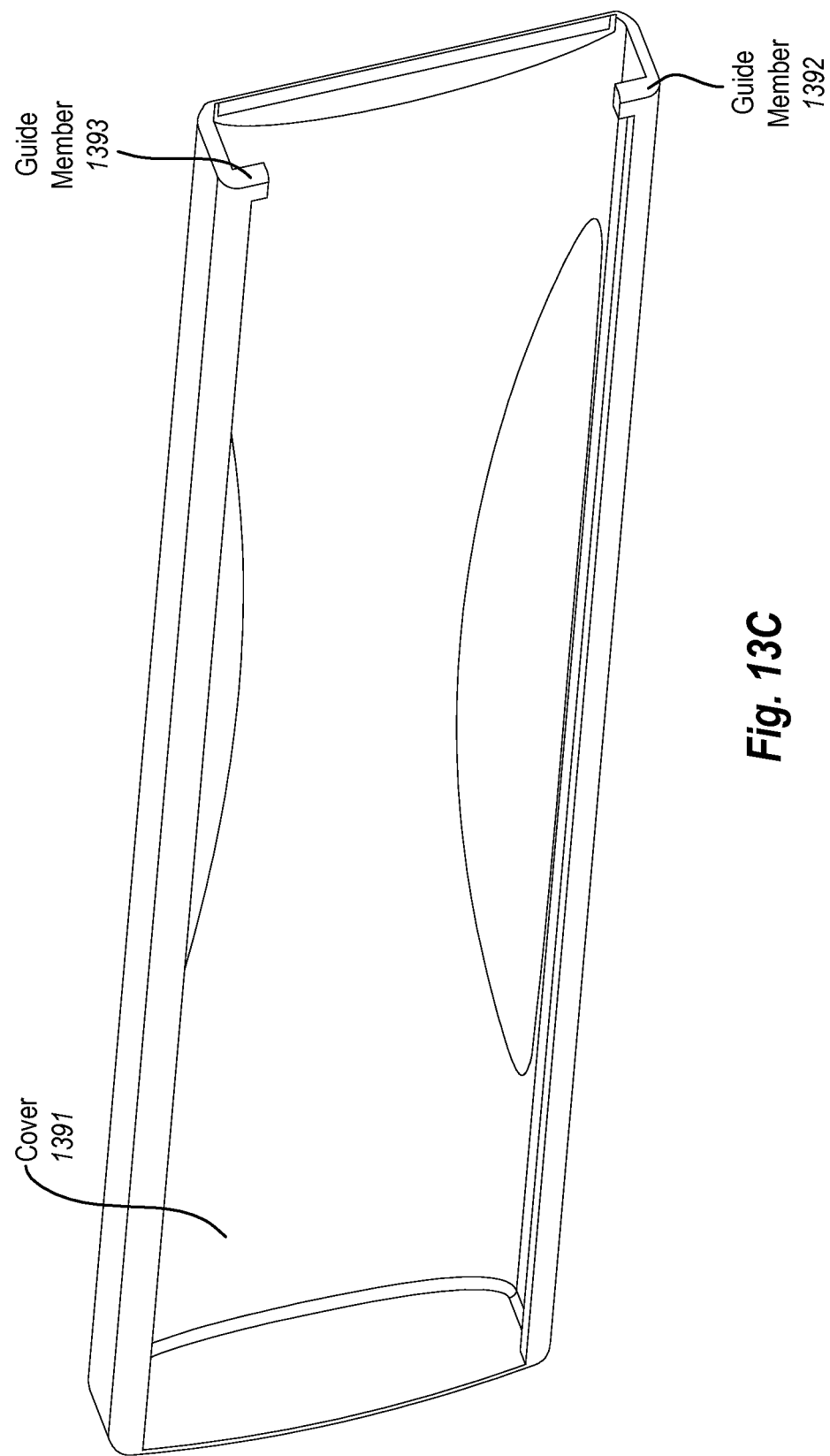
Figure 13D:
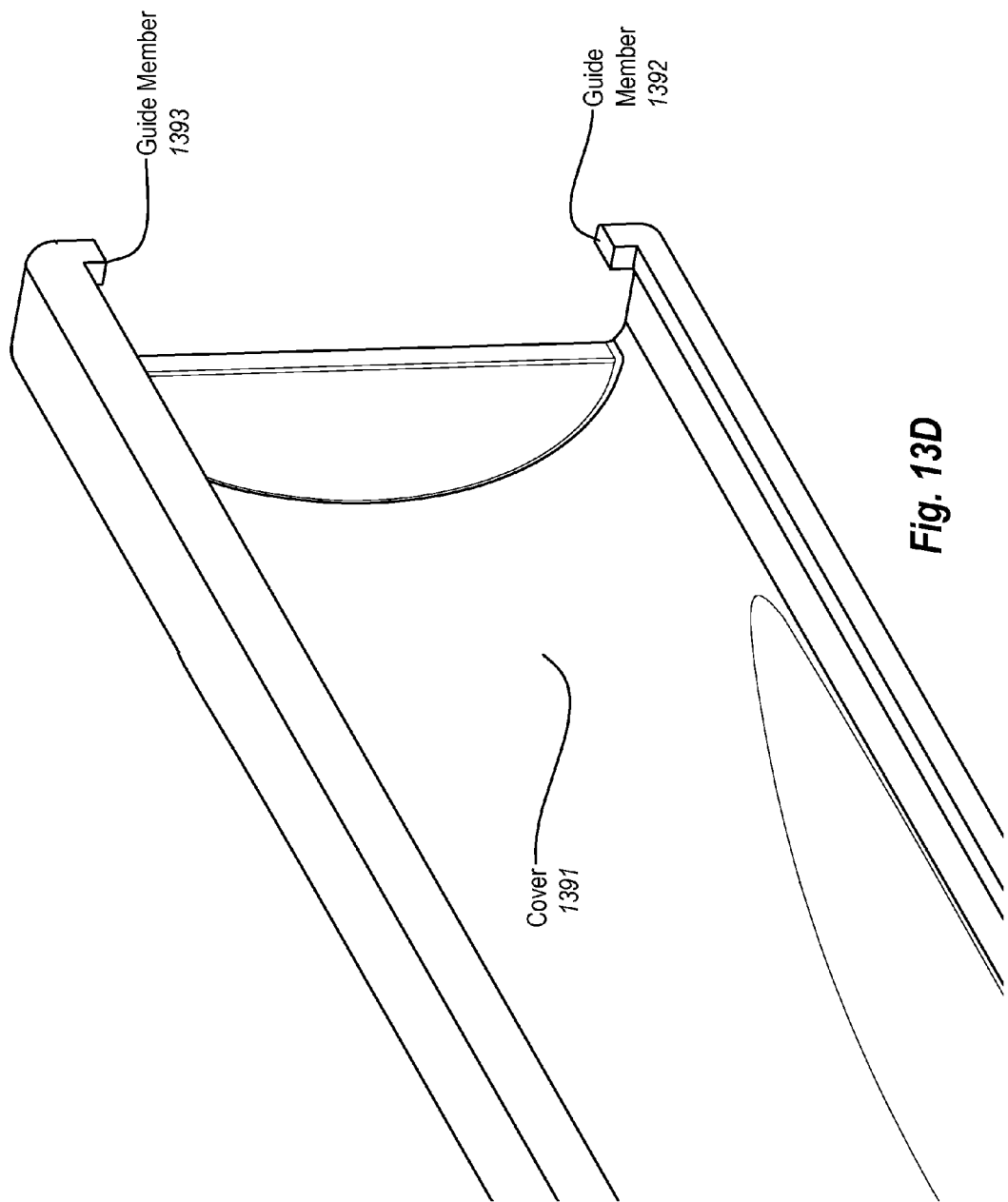
Figure 13E:
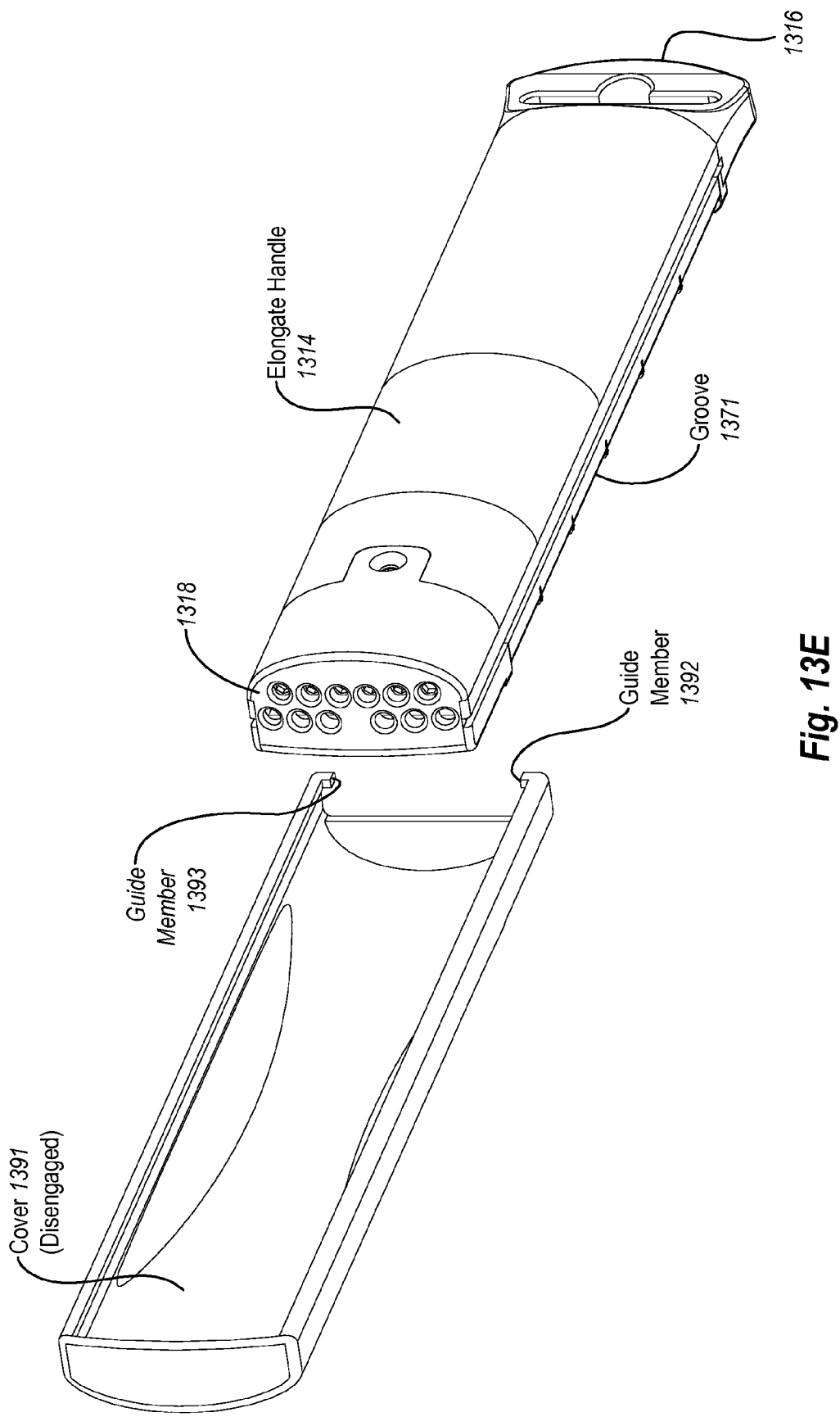
Figure 13F:
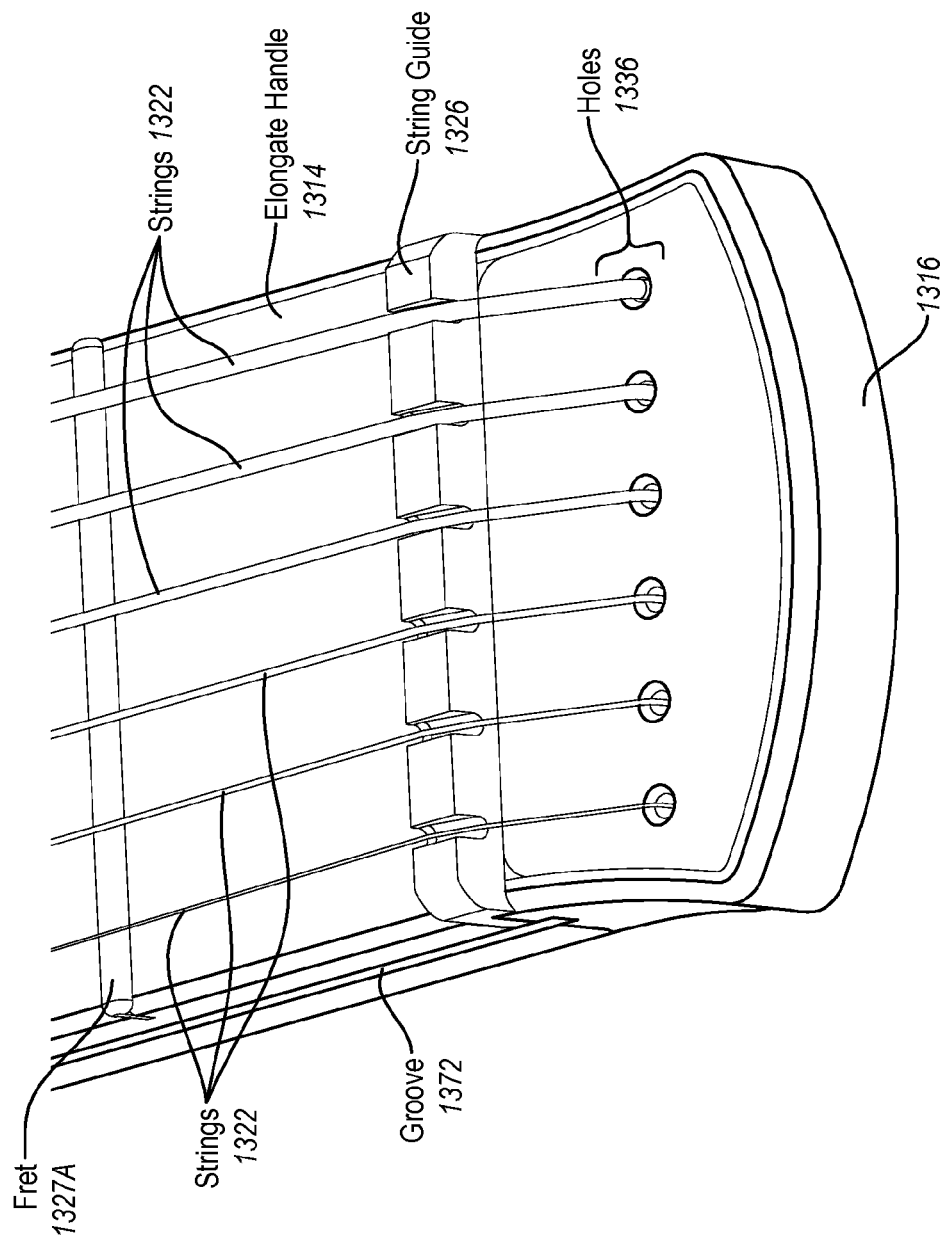
Figure 13G:
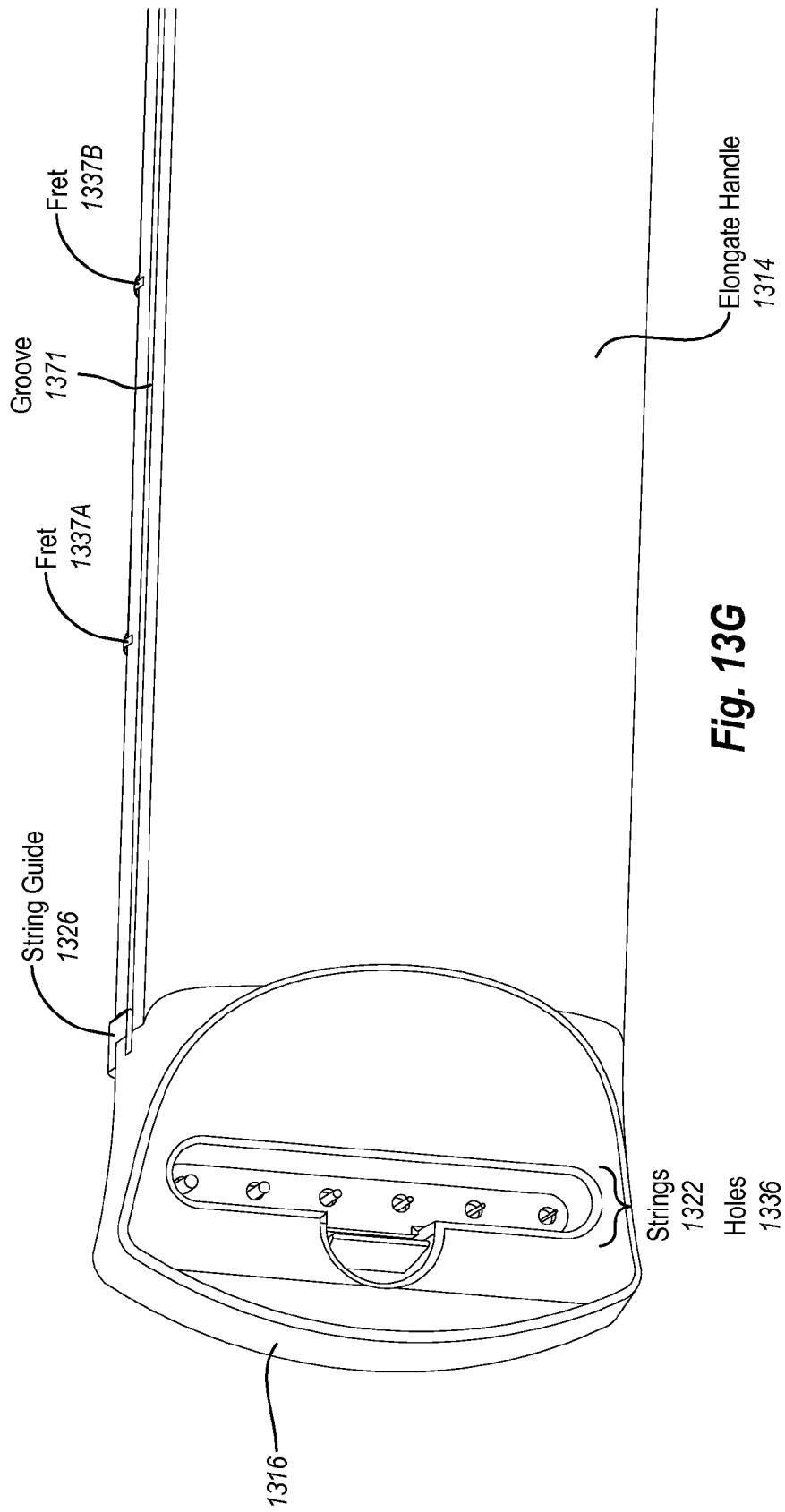
Figure 13H:
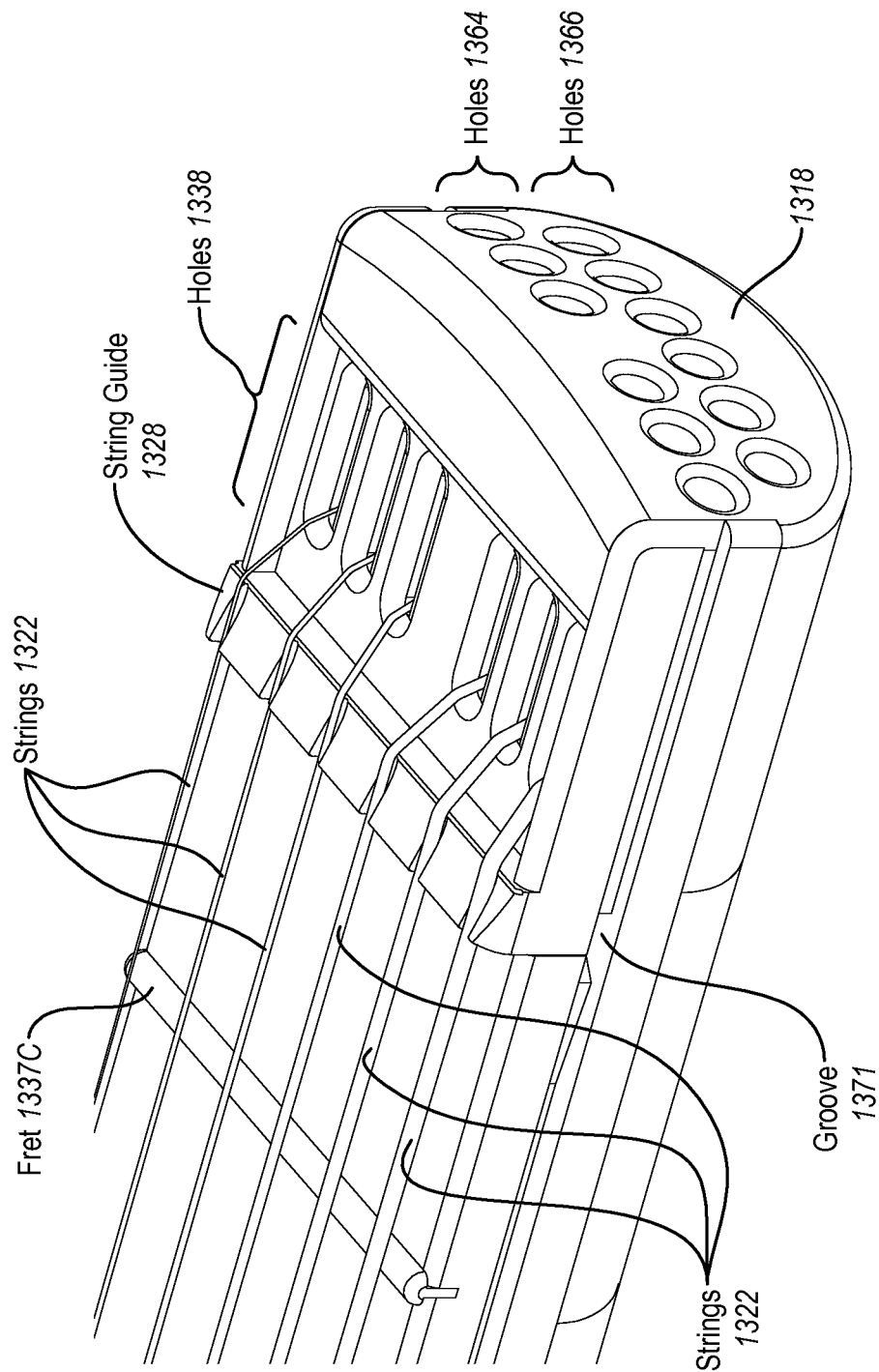
Figure 13I:
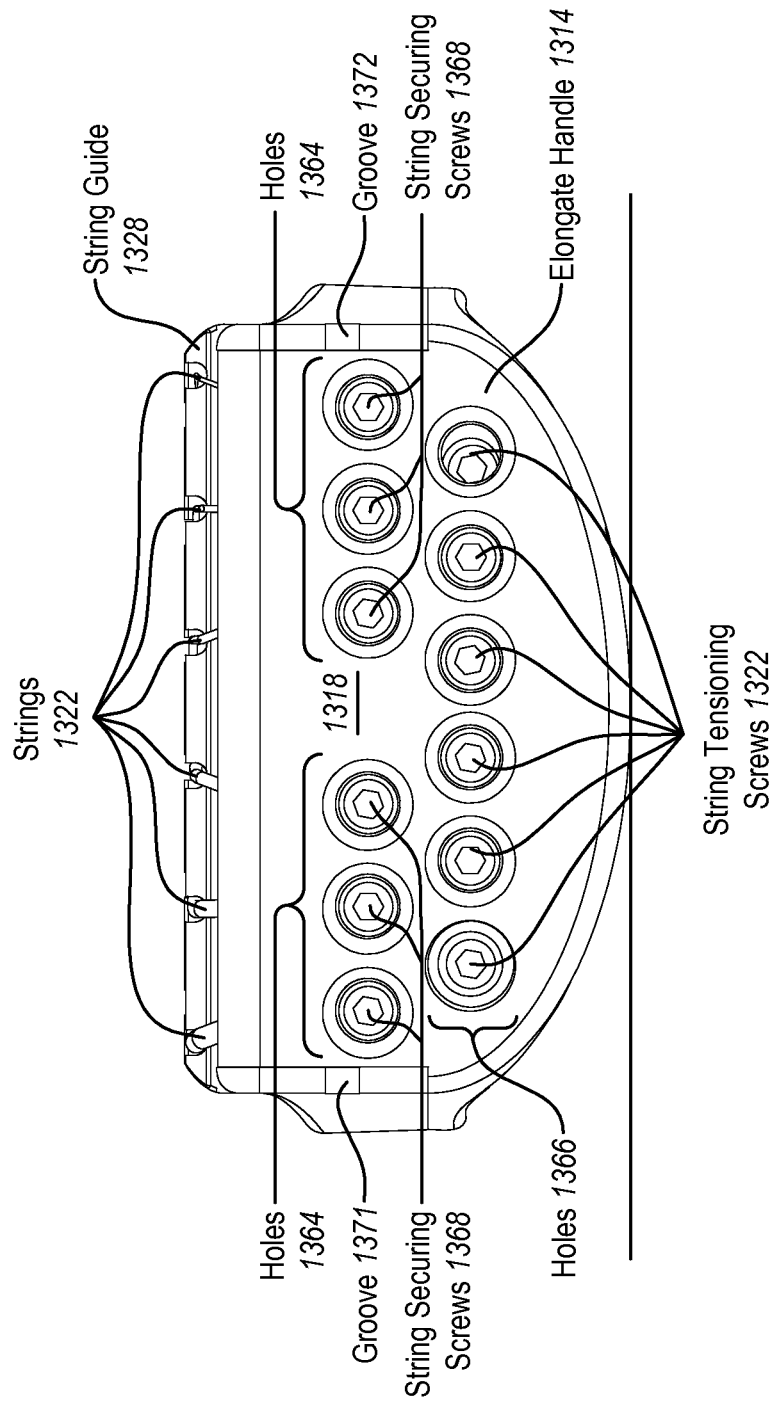
Figure 13J:
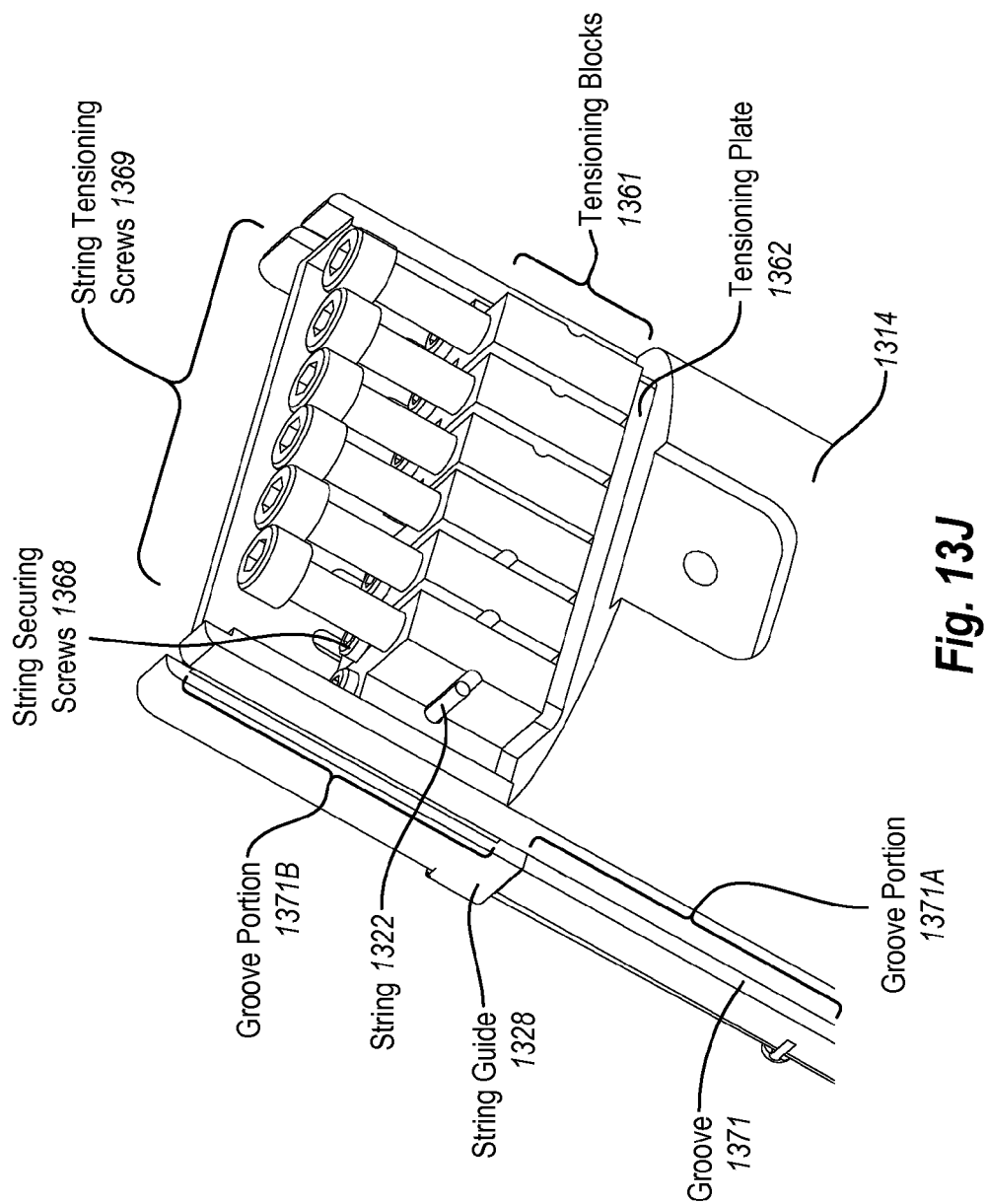
Figure 13K:
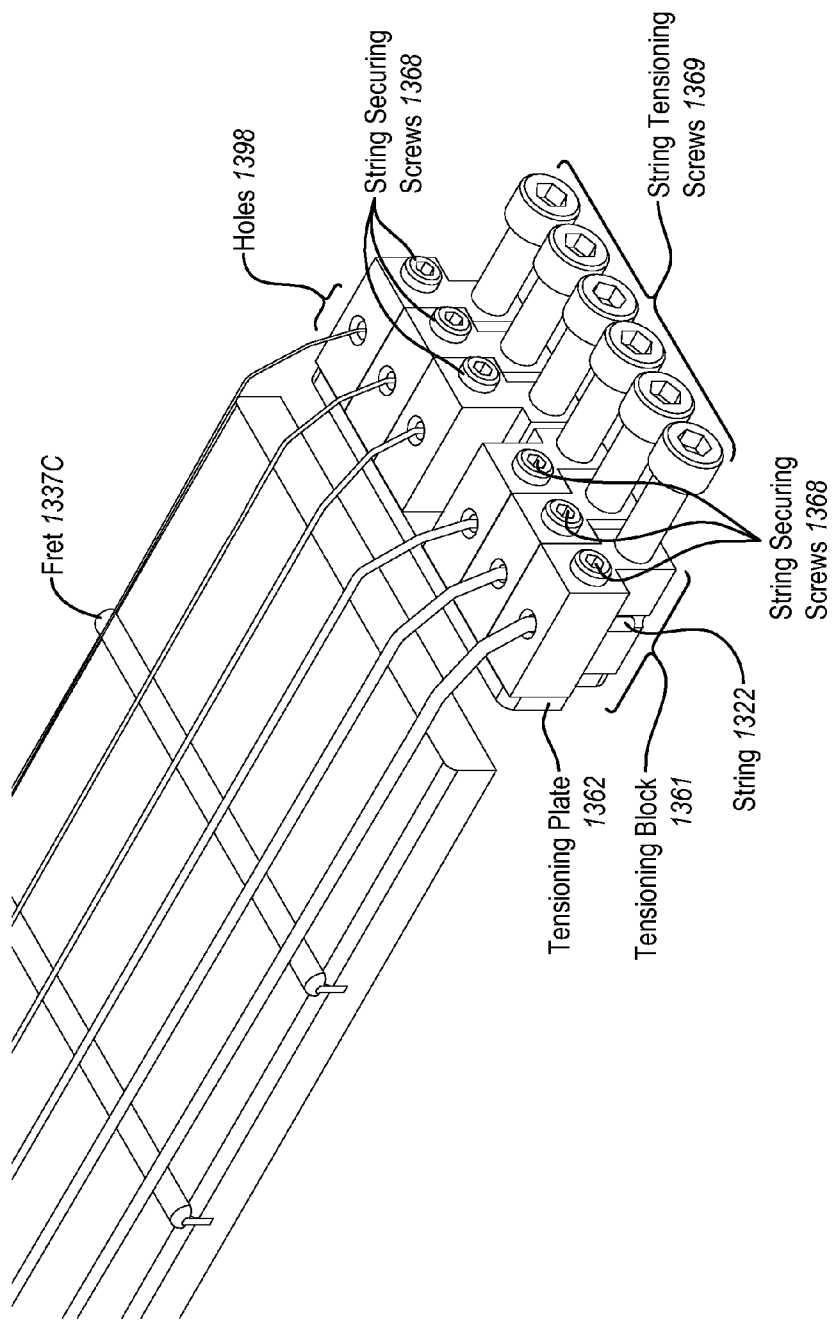
Figure 13L:
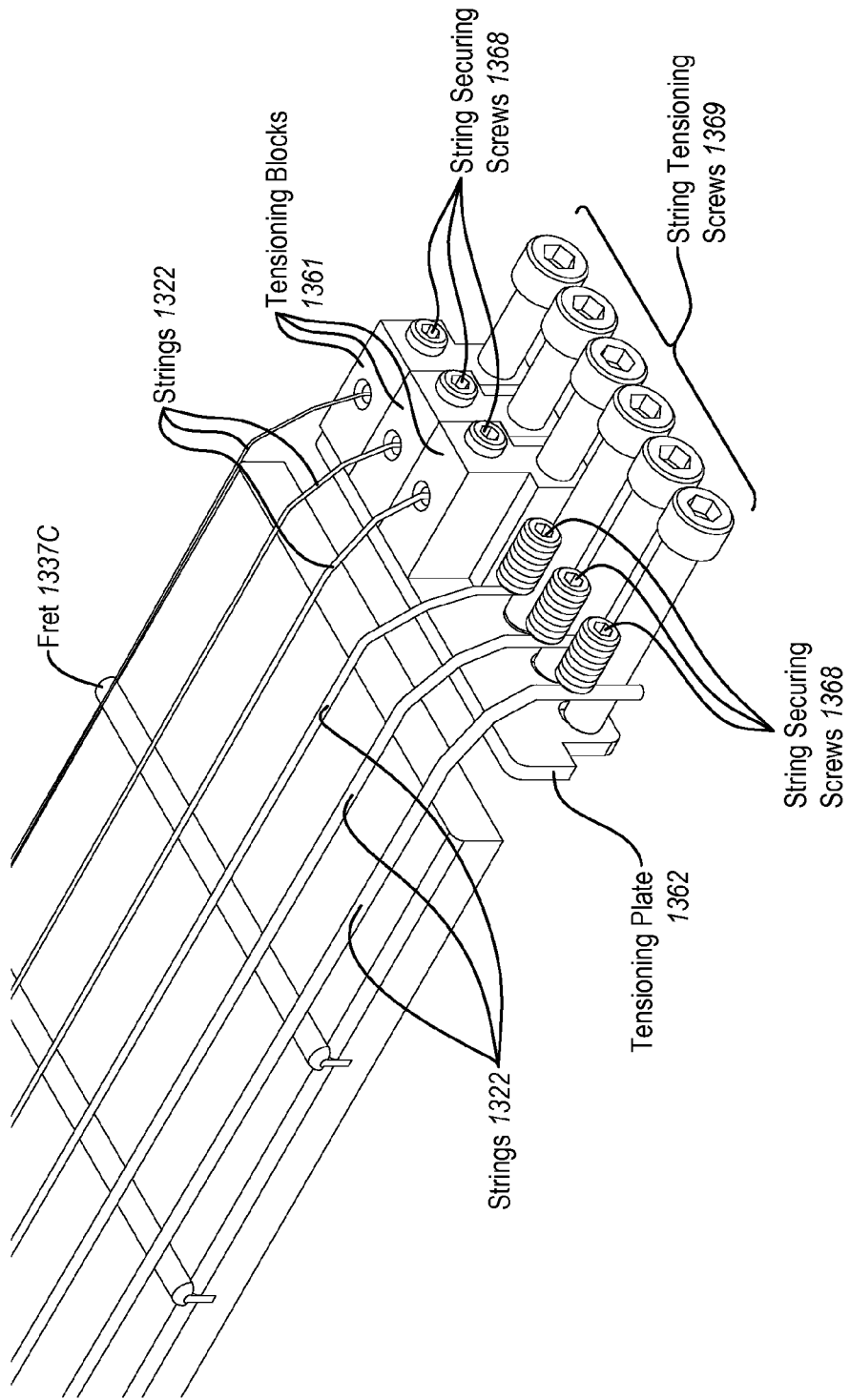
Figure 13M:
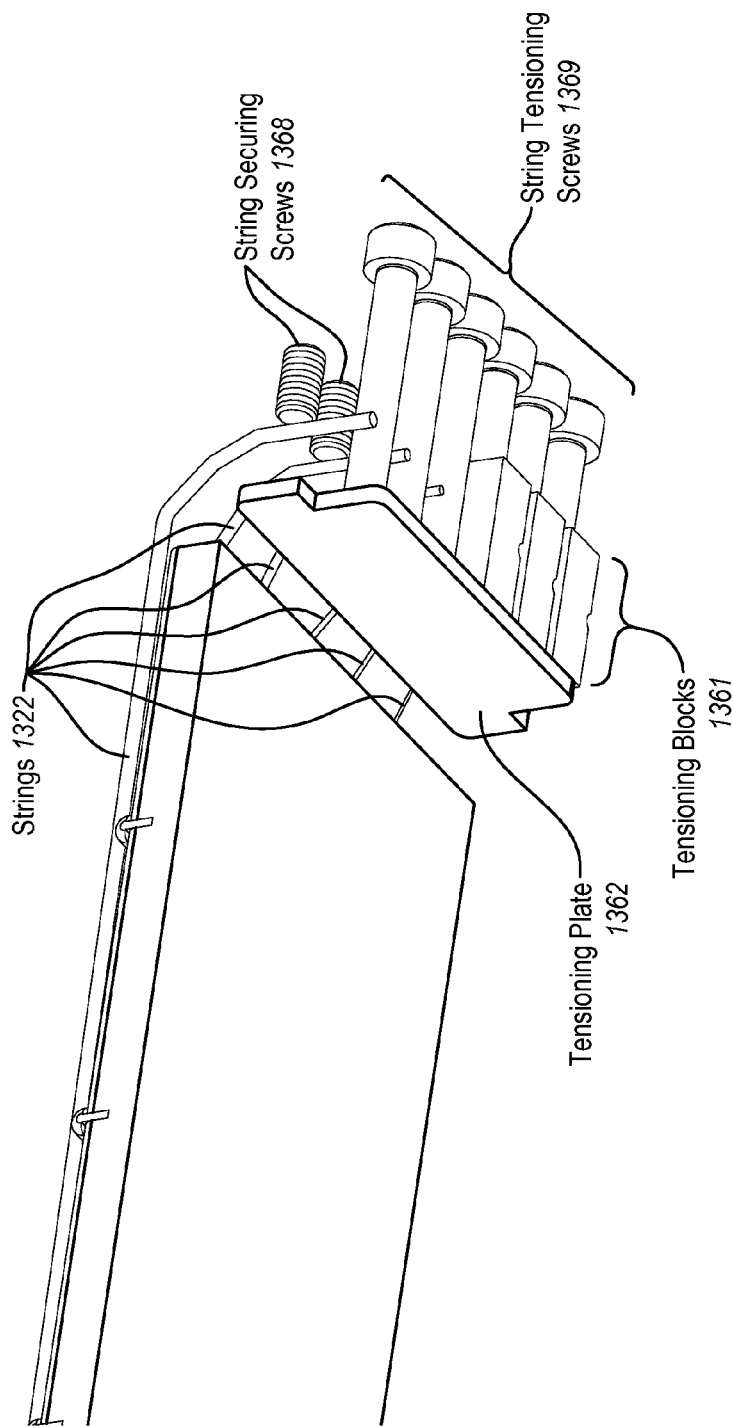

FIGS. 13A and 13M illustrate views of another example stringed instrument practice device 1300. FIG. 13A illustrates a side angle view of stringed instrument practice device 1300. As depicted in FIG. 13A, stringed instrument practice device 1300 includes elongate handle 1314 (including ends 1316 and 1318), strings 1322 (see FIG. 13F), frets 1337A-1337C, and cover 1391. Cover 1391 is retracted to cover other components on the front side of stringed instrument practice device 1300.

When cover 1391 is extended, other components on the front side of stringed instrument practice device 1300 are exposed. Elongate handle 1314 can be constructed from various materials and combines a neck portion along with a fret board on top of the neck portion. Frets 1337A-1337C are similar to frets 37. String guides 1326 and 1328 are similar to string guides 26 and 28 and include grooves for strings 1322. Strings 1322 are similar to strings 22. Each of strings 1322 can also include a ball end, such as, for example, a brass or plastic ball, nut, or ferrule, affixed to one end of the string. For each string 1322 a ball end can be used to attached the string 1322 to elongate handle 1314.

As depicted, elongate handle 1314 also includes groove 1371. Groove 1371 runs essentially between string guide 1326 and end 1318 on the upside of elongate handle 1314 (i.e., for a right handed practice deice, the side of elongate handle 1314 that faces up when a user is practicing). Another similarly configured groove 1372 (see FIG. 13F) can be included on the downside of elongate handle 1314 (i.e., opposite of groove 1371 or, for a right handed device, the side of elongate handle 1314 that faces down when a user is practicing). Cover 1391 can include guide members 1392 and 1393 (see FIG. 13C) that extend into groove 1371 and into groove 1372 respectively. As such, cover 1391 can slide in groove 1371 and groove 1372. Guide members 1392 and 1393 reduce the possibility of cover 1391 disengaging from elongate handle 1314 due to forces other than those moving cover 1391 essentially parallel to grooves 1371 and 1372 (e.g., sliding cover 1391 towards end 1316 or towards end 1318).

In general, grooves 1371 and 1372 can be of different depths at different locations along elongate body 1314. For example, groove portion 1371A can be set at a first depth into elongate handle 1314. Groove portion 1371B can be set at a second depth into elongate handle 1314. In some embodiments, the first depth is greater than the second depth (i.e., groove portion 1371A is deeper than portion 1371B). Cover stop 1382 is a transition between the first depth (of groove portion 1371A) and the second depth (of grove portion 1371B). Groove 1372 can be similarly configured.

In these embodiments, the length of guide members 1392 and 1393 can be at least somewhat greater than the second depth (e.g., the depth of groove portion 1371B) and at least somewhat less than the first depth (e.g., the depth of groove portion 1371A). As such, when cover 1391 slides towards end 1316, guide members 1392 and 1393 encounter reduced resistive bias when sliding in groove portion 1371A and corresponding first depth portion of groove 1372. On the other hand, when cover 1391 slides towards end 1318, the guide members 1392 and 1393 encounter increased resistive bias upon engaging with cover stop 1382 and a cover stop within groove 1372 as well as when sliding through groove portion 1371B and a second depth potion of grove 1372. When sliding, guide members 1392 and 1393 can engage with cover stop 1382 and a corresponding cover stop in groove 1372 respectively. Additional manual force can be used to slide cover 1391 past cover stop 1382 and the cover stop within groove 1372 as well as through all of groove portion 1371B and the second depth portion of groove 1372. The additional manual force can be applied until cover 1391 is completely disengaged from elongate member 1314.

FIG. 13B illustrates cover 1391 fully disengaged from elongate handle 1314. FIG. 13C illustrates a further view of cover 1391. As depicted, cover 1391 includes guide members 1392 and 1393. FIG. 13D illustrates a magnified view of guide members 1392 and 1393.

Thus, during extension of cover 1391, it may be that guide member 1392 reaches cover stop 1382 and guide member 1393 reaches a corresponding cover stop in groove 1372. The cover stops can stop movement of cover 1391 and/or indicate that a groove portion with increased resistive bias has been reached. Generally, (a) resting guide members against the cover stops or (b) extending the guide members just past the cover stops (into a groove portion with increased resistive bias) can reduce (or even eliminate) further unwanted movement of cover 1391. For example, cover stops or increased resistive bias can reduce further extension or retraction that may move cover 1391 into an inappropriate position (e.g., during practice). However, when in this or a similar configuration, cover 1391 is not so tightly secured to prevent a user from intentionally moving (sliding) cover 1391, for example, to retract cover 1391 to cover the front or elongate handle 1314 or to fully extended cover 1391, potentially to a point that cover 1391 fully disengages from elongate handle 1314.

In general, some amount of cover 1391 can be extended (e.g., similar to the depictions in FIGS. 5, 8, and 12) to provide an additional support area that can rest against a user when practicing.

FIG. 13E illustrates cover 1391 (fully disengaged) and elongate handle 1314. The view of elongate handle 1314 is a back view (or the side of elongate handle 214 that faces toward a user when practicing). As depicted in FIG. 13E, the back side of elongate handle 1314 (or the side of stringed instrument practice device 1300 that faces toward, and possibly rests against, a user when practicing) is rounded to represent neck of a guitar. For example, the backside of elongate handle 1314 can be configured to match any of a variety of different neck radii, including a "C" shape, a "V" shape, a "U" shape, or combinations thereof. However, the back side of a stringed instrument practice device can be formed to represent the neck of virtually any stringed instrument.

FIG. 13F illustrates a view of a portion of elongate handle 1314 closer to end 1316. As depicted, strings 1322 go into corresponding holes 1336. Also depicted is a groove 1372 (for a right handed device on the downside of elongate handle 1314 when stringed instrument practice device 1300 is in use). When cover 1391 is engaged with elongate handle 1314, guide member 1393 can slide in groove 1372. 1316. As previously described, each of strings 1322 includes a ball end at one end. The ball ends can hold strings 1322 in the backside of holes 1336.

FIG. 13G illustrates a backside view of elongate handle 1314 closed to end 1316. Portions of each hole 1336 can be of different diameters. A back side portion each hole 1336 can have a diameter large enough for a ball end to fit through. A front side portion of each hole can have a diameter large enough for a string 1322 to pass through but not large enough for a ball end to fit through. Thus, for each string 1322, the end of the string without the ball end can be pushed up through the back side of a corresponding hole 1336. The string 1322 can be pulled through the corresponding hole 1336 until the ball end is stopped by the smaller diameter of the front side portion of the corresponding hole 1336. Thus, the ball end is retained within the larger diameter of the back side portion of corresponding hole 1336. (The string can then be placed in the appropriate location in string guides 1326 and 1328 and the other end of the string secured at end 1318).

FIG. 13H illustrates a magnified front side view of a portion of elongate handle 1314 closer to end 1318. As depicted, strings 1322 go into corresponding holes 1338. Holes 1338 can be configured to accommodate tensioning blocks contained within elongate handle 1314. Based on the desired tensioning of each string 1322, the string 1322 can be pulled towards end 1318. The configuration of holes 1338 provides space for string movement related to string tensioning. Holes 1364 and 1366 are depicted on end 1318.

FIG. 13I illustrates an end view of end 1318. As depicted, each hole 1364 provides access to a corresponding string securing screw 1368. Securing screws 1368 are used to secure strings 1322 at end 1318. Each hole 1366 provides access to a corresponding string tensioning screen 1369. String tensioning screws 1369 are used to adjust the tension in strings 1322 after strings 1322 are secured at end 1318. As depicted, string securing screws 1368 and string tensioning screws 1369 are hex headed screws (of different sizes). However, other types of screw heads can also be used.

FIG. 13J illustrates a backside view of elongate handle 1314 with a visibility inside elongate handle 1314. Tension blocks 1361 and tensioning plate 1362 are depicted. Elongate handle 1314 can include a tensioning block 1361 for each string 1322. Each tensioning block 1361 includes a corresponding string securing screw 1368 and string tensioning screw 1369. FIG. 13K illustrates an internal view of end 218. Turning to FIG. 13K, each tensioning block 1361 includes a hole 1398. Each of strings 1322 can be passed through a corresponding hole 1338 and through a corresponding hole 1398. A string 1322 can be pushed through hole 1338 until it comes out on the back side of a corresponding tensioning block 1361 where a groove in the tensioning block 1361 can be used to accommodate the string 1322. The corresponding string securing screw 1368 can then be tightened to secure the string at end 1318.

Once secured, a string tensioning screw 1369 can be adjusted to tension secured string 1322. FIG. 13L illustrates a view with some of the tensioning blocks 261 removed. As depicted in FIG. 13L, each string tensioning screw 1369 is in contact with tensioning plate 1362. A string tensioning screw 1369 can be adjusted in one direction (e.g., clockwise) to push the corresponding tensioning block 1361, and thus also any secured string 1322, away from tensioning plate 1362. This increases the tension in (tightens) the secured string 1322. On the other hand, a string tensioning screw 1369 can be adjusted in another direction (e.g., counter clockwise) to push the corresponding tensioning block 1361, and thus also any secured string 1322, towards tensioning plate 1362. This decreases the tension in (loosens) the secured string 1322. In some embodiments, the tension in each string 1322 is set to approximate that of a corresponding string of a tuned guitar.

FIG. 13M illustrates a further back side cut away view strings 1322, some of the tensioning blocks 1361, tensioning plate 1362, some of the sting securing screws 1368, and string tensioning screws 1369.

Embodiments of the invention also include left handed stringed instrument practice devices. For example, the ordering of strings from thicker diameter to smaller diameter can be inverted.

Accordingly, embodiments of the invention include a stringed instrument practice device that can be used to practice established chords, finger picking methods, chord integration, and strengthening finger tips. Embodiments of the invention can be designed so that a user can hold an elongate handle and place one or more of his or her fingers on strings as a way of practicing the fingerings that are used to play the chords/notes of the stringed musical instrument. Since real strings can be used, a stringed instrument practice device in accordance with the principles of the present invention also helps to strengthen a user's fingertips and get the fingertips accustomed to holding/pinching the instrument strings. Further, since stringed instrument practice device can be hand-held, portable, and potentially sized to fit within the user's hand, a user can realize advantages of the invention and utilize practice methods while the user is "on the go," riding on a bus, watching television, waiting in line, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A device, the device comprising:
   an elongate handle representing a neck portion of a musical instrument, the elongate handle including a first end, a second end, a first side, and a top portion;
   at least one set of string holders, each of the at least one set of string holders including:
   a first string holder toward the first end, the first string holder configured to secure a string in place toward the first end; and
   a corresponding second string holder toward the second end, the second string holder configured to secure the string in place toward the second end; and
   a recessed portion that runs along the first side of the elongate handle, the recessed portion configured to receive a portion of a component that is slidable within the recessed portion to expose or cover the top portion of the elongate handle.

2. The device as recited in claim 1, further comprising a slidable cover component, the slidable cover component including a first side, the first side of the slidable cover component having a first guide member configured in size and shape to slidably engage within the recessed portion.

3. The device as recited in claim 2, wherein the recessed portion includes a first part and a second part, the first part having a first depth and the second part having a second depth, the first depth being deeper than the second depth.

4. The device as recited in claim 3, wherein the first guide member is of a specified length, the specified length being between the first depth and the second depth, the guide member configured to:
   slide with a first resistive bias in the first part of the recessed portion, and
   slide with a second increased resistive bias in the second part of the recessed portion.

5. The device as recited in claim 3, the elongate handle further comprising a second side, the second side included second recessed portion that runs along the second side of the elongate handle, the second recessed portion including a first part and a second part, the first part of the second recessed portion having essentially the first depth and the second part of the second recessed portion having essentially the second depth.

6. The device as recited in claim 5, wherein the slideable cover component includes a second side, the second side of the slidable cover component side having a second guide member configured in size and shape to slidably engage within the second recessed portion.

7. The device as recited in claim 2, wherein slidable cover component includes a plurality of ridges, the plurality of ridges for simulated strumming of strings of the musical instrument.

8. The device as recited in claim 2, wherein the slidable cover component includes a plurality of strings secured to the slideable cover component, the second plurality of strings for simulated strumming of strings of the musical instrument.

9. The device as recited in claim 2, further comprising a plurality of strings, the plurality of strings secured by corresponding first and second string holders and running along the top portion between the first end of the elongate handle and the second end of the elongate handle.

10. The device of claim 9, wherein the top portion includes a first string guide at the first end and a second string guide at the second end, the first and second strings guides maintaining appropriate spacing between each of the plurality of strings.

11. The device as recited in claim 9, wherein the slidable cover component includes a second plurality of strings secured to the slideable cover component, the second plurality of strings for simulated strumming of strings of the musical instrument.

12. The device as recited in claim 9, wherein each second string holder comprising a tensioning block, a securing screw, and a tensioning screw, the securing screw for securing a corresponding string to the tensioning block, the tensioning screw for adjusting the tension in the secured string.

13. The device as recited in claim 12, further comprising a tensioning plate and wherein the tensioning screw adjusts tension in the secured string by pressing more or less against the tensioning plate.

14. The device as recited in claim 1, wherein the stringed musical instrument is a stringed musical instrument selected from among: a guitar, a bass-guitar, a violin, a viola, a cello, a bass, a double bass, a mandolin, and a banjo.

15. The device as recited in claim 1, wherein the top portion includes a plurality of frets constructed from fret wire, the plurality of frets representing a portion of a fret board.

16. A device for practicing a stringed musical instrument, the device comprising:
   an elongate handle representing a neck portion of the stringed musical instrument, the elongate handle including a first end, a second end, a first side, and a top portion, the elongate handle sized and configured to fit in the hand of a user of the device;
   a plurality of sets of string holders, each of the plurality of sets of string holders including:

a first string holder toward the first end, the first string holder configured to secure a string in place toward the first end; and a second string holder toward the second end, the second string holder configured to secure the string in place toward the second end; and a variable depth groove on the first side of the elongate handle, the variable depth grove running essentially from the first string holder to the second end of the elongate handle, a first part of the variable depth groove running from a location on the first side near to a cover stop, a second part of the variable depth groove running from the cover stop to essentially the second end of the elongate handle, the first part of the variable depth groove having a first depth, the second part of the variable depth groove having a second depth, the first depth being deeper than the second depth.

17. The device as recited in claim 16, further comprising a slidable cover, the slidable cover having a protrusion configured to slide within the variable depth groove such that the slidable cover exposes or covers the plurality of strings running along the top portion of the elongate handle.

18. The device as recited in claim 17, wherein the slidable cover includes a top portion having a plurality of ridges, the plurality of ridges for simulated strumming of strings of the musical instrument.

19. The device as recited in claim 17, wherein the slidable cover includes a top portion having a plurality of strings secured to the slideable cover, the plurality of strings for simulated strumming of strings of the musical instrument.

20. A guitar practice device used to practice playing a stringed instrument, the device comprising:

an elongate handle representing a neck portion of a guitar, the elongate handle including a first end, a second end, a first side, and a portion of a fret board;

a plurality of sets of string holders configured to secure a plurality of strings that run along the fret board between the first end and the second end, each of the plurality of sets of string holders including:
  a first string holder configured to hold a string in place at the first end; and
  a second string holder configured to hold the string in place at the second end;

a recessed portion that runs along the first side, a first part of the recessed portion having a first depth and a second part of the recessed portion having a second depth, the first depth being deeper than the second depth; and a slidable cover component, the slidable cover component slidable over the portion of the fret board to cover or expose the portion of the fret board, the slidable cover component including a first side having a guide member configured in size and shape to slidably engage within the recessed portion, the guide member of a specified length, the specified length being between the first depth and the second depth.

* * * * *